United States Patent
Krishnan et al.

(10) Patent No.: US 12,160,764 B2
(45) Date of Patent: Dec. 3, 2024

(54) DATA COLLECTION ENHANCEMENTS FOR MULTICAST BROADCAST SERVICES

(71) Applicant: QUALCOMM Incorporated, San Diego, CA (US)

(72) Inventors: Shankar Krishnan, San Diego, CA (US); Xipeng Zhu, San Diego, CA (US); Prasad Reddy Kadiri, San Diego, CA (US); Rajeev Kumar, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 17/478,214

(22) Filed: Sep. 17, 2021

(65) Prior Publication Data
US 2023/0088234 A1   Mar. 23, 2023

(51) Int. Cl.
*H04W 24/10* (2009.01)
*H04W 4/06* (2009.01)
*H04W 36/08* (2009.01)

(52) U.S. Cl.
CPC ............ *H04W 24/10* (2013.01); *H04W 4/06* (2013.01); *H04W 36/08* (2013.01)

(58) Field of Classification Search
CPC ....... H04W 24/10; H04W 4/06; H04W 36/08; H04W 24/02; H04W 36/0079
See application file for complete search history.

(56) References Cited

U.S. PATENT DOCUMENTS

| | | | | |
|---|---|---|---|---|
| 11,290,899 | B2 * | 3/2022 | Van Lieshout | H04L 43/08 |
| 11,438,784 | B2 * | 9/2022 | Teyeb | H04W 24/10 |
| 11,882,473 | B2 * | 1/2024 | Wahaj Arshad | H04W 24/02 |
| 2012/0329402 | A1 * | 12/2012 | Ren | H04W 24/10 455/67.11 |
| 2013/0084809 | A1 * | 4/2013 | Johansson | H04W 76/19 455/67.11 |
| 2013/0128756 | A1 * | 5/2013 | Zhang | H04W 4/06 370/252 |
| 2017/0272968 | A1 * | 9/2017 | Kim | H04W 24/10 |
| 2017/0295054 | A1 * | 10/2017 | Lee | H04L 41/06 |
| 2018/0192317 | A1 * | 7/2018 | Fukuta | H04W 4/06 |
| 2019/0116461 | A1 * | 4/2019 | Callender | H04W 36/0088 |
| 2020/0128419 | A1 * | 4/2020 | Van Lieshout | H04W 24/08 |
| 2022/0182850 | A1 * | 6/2022 | Ramachandra | H04W 16/28 |
| 2023/0057408 | A1 * | 2/2023 | Ramachandra | H04W 24/10 |
| 2023/0171632 | A1 * | 6/2023 | Bansal | H04W 24/02 370/252 |

(Continued)

FOREIGN PATENT DOCUMENTS

WO   WO-2023186326 A1 * 10/2023

*Primary Examiner* — Habte Mered
(74) *Attorney, Agent, or Firm* — Holland & Hart LLP

(57) ABSTRACT

Methods, systems, and devices for wireless communication are described. A user equipment (UE) may receive control signaling indicating a measurement configuration for minimization of drive test measurement and reporting supporting broadcast receptions within a single-frequency network. The UE may determine, based at least in part on the measurement configuration, a set of measurements for the single-frequency network. The UE may transmit a minimization of drive test report indicating the set of measurements.

22 Claims, 20 Drawing Sheets

(56) References Cited

U.S. PATENT DOCUMENTS

| | | | |
|---|---|---|---|
| 2023/0189382 A1* | 6/2023 | Haustein | H04W 76/20 370/329 |
| 2024/0040450 A1* | 2/2024 | Zeng | H04W 8/14 |
| 2024/0107335 A1* | 3/2024 | Shrestha | H04W 24/10 |

* cited by examiner

DATA COLLECTION ENHANCEMENTS FOR MULTICAST BROADCAST SERVICES

FIELD OF TECHNOLOGY

The following relates to wireless communication, including data collection enhancements for multicast broadcast services.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support data collection enhancements for multicast broadcast services (MBS). Generally, the described techniques leverage minimization of drive testing (MDT) procedures to improve MBS-based communications. One example includes an MDT measurement configuration being configured that supports MBS based communications. For example, a base station may use control signaling (e.g., radio resource control (RRC) signaling) to configure a user equipment (UE) with the MDT measurement configuration. The MDT measurement configuration may support various MDT measurements within a single-frequency network (SFN) being performed for the MBS beams, cells, etc. That is, the measurement configuration may include or otherwise identify various measurements of the MBS based communications to be performed. The UE may determine the set of measurements for the SFN according to the measurement configuration and transmit an MDT report indicating the set of measurements. The base station (e.g., the network) may optimize MBS based communications based on the MDT report (e.g., scheduling decisions, allocation decisions, interference-mitigation decisions, handover decisions, and the like) based on the set of measurements.

Some aspects include improved load balancing for MBS-related communications. That is, load metrics exchanges are currently exchanged for unicast based communications. However, the described techniques include the capture and exchange of MBS-related communication metrics in addition to the unicast related communication metrics. Next Generation-Radio Access Network (NG-RAN) node (e.g., base stations) within the network may capture and share the unicast and MBS-related communication metrics and use this information to improve scheduling decisions that improve the MBS and unicast transmissions. Examples of the MBS-related communication metrics include, but are not limited to, the load level per cell for unicast and MBS, load level per beam for unicast and MBS, the load level per slice for unicast and MBS, as well as an indication of the load per SFN for MBS. Accordingly, the nodes may use the information indicated in the load balancing messages to optimize MBS-related communications in addition to unicast communications. includes improved handover procedures that support MBS based communications. For example, base stations participating in a handover procedure (or at least attempt to participate in the handover procedure) may collect and share various MBS-based metrics associated with the handover procedure. For example, in an unsuccessful handover procedure the metrics (e.g., information) may include information distinguishing MBS-related handover failures from non-MBS based handover failures (e.g., MBS-related failure causes, identifying information associated with the MBS communications, and the like). The MBS-related information included in the handover report may be used to improve handovers between MBS supporting cells, between MBS supporting cells and non-MBS supporting cells, and/or between non-MBS supporting cells and MBS supporting cells. Moreover, this may include including MBS-related measurements in the logged/immediate MDT reports as well as mobility history reports. Accordingly, handover procedures of UE from one base station to the next may be improved in the situation where the UE is performing MBS based communications within the SFN.

Some aspects improve load balancing for MBS-related communications. That is, load metrics exchanges are currently exchanged for unicast based communications. However, the described techniques include the capture and exchange of MBS-related communication metrics in addition to the unicast related communication metrics. NG-RAN node (e.g., base stations) within the network may capture and share the unicast and MBS-related communication metrics and use this information to improve scheduling decisions that improve the MBS and unicast transmissions. Examples of the MBS-related communication metrics include, but are not limited to, the load level per cell for unicast and MBS, load level per beam for unicast and MBS, the load level per slice for unicast and MBS, as well as an indication of the load per SFN for MBS. Accordingly, the nodes may use the information indicated in the load balancing messages to optimize MBS-related communications in addition to unicast communications.

A method for wireless communication at a UE is described. The method may include receiving control signaling indicating a measurement configuration for MDT measurement and reporting supporting broadcast receptions within a SFN, determining, based on the measurement configuration, a set of measurements for the SFN, and transmitting a MDT report indicating the set of measurements.

An apparatus for wireless communication at a UE is described. The apparatus may include a processor, memory coupled with the processor, and instructions stored in the memory. The instructions may be executable by the processor to cause the apparatus to receive control signaling indicating a measurement configuration for MDT measurement and reporting supporting broadcast receptions within a SFN, determine, based on the measurement configuration, a set of measurements for the SFN, and transmit a MDT report indicating the set of measurements.

Another apparatus for wireless communication at a UE is described. The apparatus may include means for receiving control signaling indicating a measurement configuration for MDT measurement and reporting supporting broadcast receptions within a SFN, means for determining, based on the measurement configuration, a set of measurements for the SFN, and means for transmitting a MDT report indicating the set of measurements.

A non-transitory computer-readable medium storing code for wireless communication at a UE is described. The code may include instructions executable by a processor to receive control signaling indicating a measurement configuration for MDT measurement and reporting supporting broadcast receptions within a SFN, determine, based on the measurement configuration, a set of measurements for the SFN, and transmit a MDT report indicating the set of measurements.

Some examples of the method, apparatuses, and non-transitory computer-readable medium described herein may further include operations, features, means, or instructions for performing the MDT measurements of the SFN used for the broadcast receptions while operating in a connected mode, where the set of measurements may be based on the MDT measurements performed while operating in the connected mode.

Some examples of the method, apparatuses, and non-transitory computer-readable medium described herein may further include operations, features, means, or instructions for transmitting the MDT report while operating in the connected mode.

In some examples of the method, apparatuses, and non-transitory computer-readable medium described herein, the MDT report indicates an interruption time associated with a handover procedure, a data volume level, a multicast transmission/retransmission success ratio, a unicast transmission/retransmission success ratio, a switching rate, or a combination thereof.

Some examples of the method, apparatuses, and non-transitory computer-readable medium described herein may further include operations, features, means, or instructions for performing the MDT measurements of the SFN while operating in an inactive mode or an idle mode, where the set of measurements may be based on the MDT measurements.

Some examples of the method, apparatuses, and non-transitory computer-readable medium described herein may further include operations, features, means, or instructions for transmitting, based on the broadcast receptions within the SFN, an indication that the MDT report may be available.

Some examples of the method, apparatuses, and non-transitory computer-readable medium described herein may further include operations, features, means, or instructions for logging the MDT measurements performed while operating in an inactive mode or an idle mode to obtain logged MDT measurements that support broadcast receptions within the SFN.

In some examples of the method, apparatuses, and non-transitory computer-readable medium described herein, the MDT report indicates the set of measurements on a per-beam basis for the broadcast receptions within the SFN.

Some examples of the method, apparatuses, and non-transitory computer-readable medium described herein may further include operations, features, means, or instructions for identifying a trigger event associated with the broadcast receptions within the SFN that may have satisfied a threshold, where determining the set of measurements may be triggered based on the trigger event satisfying the threshold.

In some examples of the method, apparatuses, and non-transitory computer-readable medium described herein, the trigger event may be based on at least one of a reference signal received power level, a reference signal received quality level, a signal-to-interference-to-noise level, a data volume, a block level error rate, or a combination, for the broadcast receptions within the SFN.

Some examples of the method, apparatuses, and non-transitory computer-readable medium described herein may further include operations, features, means, or instructions for receiving a second control signaling indicating a second measurement configuration for MDT measurement and reporting supporting unicast receptions and determining, based on the second control signaling, a second set of measurements associated with the unicast receptions, where the MDT report indicates the set of measurements associated with the broadcast receptions within the SFN and the second set of measurements associated with the unicast receptions.

Some examples of the method, apparatuses, and non-transitory computer-readable medium described herein may further include operations, features, means, or instructions for determining, while operating in an inactive mode or an idle mode, that a link associated with the broadcast receptions may have failed, performing a handover procedure of the UE to a first base station from a second base station based on the failed link, and transmitting a logged MDT report or a mobility history report based on the failed link.

In some examples of the method, apparatuses, and non-transitory computer-readable medium described herein, the logged MDT report or the mobility history report includes an indication that the broadcast receptions failed at the UE, an indication of an identifier of the cell associated with the failed link, a failure duration associated with the failed link, or any combination thereof.

A method for wireless communication at a base station is described. The method may include identifying, for a UE, a measurement configuration for MDT measurement and reporting supporting broadcast receptions at the UE within a SFN, transmitting control signaling to the UE indicating the measurement configuration, and receiving, from the UE, a MDT report indicating a set of measurements for the SFN determined by the UE.

An apparatus for wireless communication at a base station is described. The apparatus may include a processor, memory coupled with the processor, and instructions stored in the memory. The instructions may be executable by the processor to cause the apparatus to identify, for a UE, a measurement configuration for MDT measurement and reporting supporting broadcast receptions at the UE within a SFN, transmit control signaling to the UE indicating the measurement configuration, and receive, from the UE, a MDT report indicating a set of measurements for the SFN determined by the UE.

Another apparatus for wireless communication at a base station is described. The apparatus may include means for identifying, for a UE, a measurement configuration for MDT measurement and reporting supporting broadcast receptions at the UE within a SFN, means for transmitting control signaling to the UE indicating the measurement configuration, and means for receiving, from the UE, a MDT report indicating a set of measurements for the SFN determined by the UE.

A non-transitory computer-readable medium storing code for wireless communication at a base station is described. The code may include instructions executable by a processor to identify, for a UE, a measurement configuration for MDT measurement and reporting supporting broadcast receptions at the UE within a SFN, transmit control signaling to the UE indicating the measurement configuration, and receive, from the UE, a MDT report indicating a set of measurements for the SFN determined by the UE.

Some examples of the method, apparatuses, and non-transitory computer-readable medium described herein may further include operations, features, means, or instructions for receiving the MDT report while the UE may be operating an a connected mode.

In some examples of the method, apparatuses, and non-transitory computer-readable medium described herein, the MDT report indicates an interruption time associated with a handover procedure, a data volume level, a multicast transmission/retransmission success ratio, a unicast transmission/retransmission success ratio, a switching rate, or a combination thereof.

Some examples of the method, apparatuses, and non-transitory computer-readable medium described herein may further include operations, features, means, or instructions for receiving, based on the broadcast receptions within the SFN, an indication that the MDT report may be available.

In some examples of the method, apparatuses, and non-transitory computer-readable medium described herein, the MDT report indicates the set of measurements on a per-beam basis for the broadcast receptions within the SFN.

Some examples of the method, apparatuses, and non-transitory computer-readable medium described herein may further include operations, features, means, or instructions for receiving a second control signaling indicating a second measurement configuration for MDT measurement and reporting supporting unicast receptions, where the MDT report indicates the set of measurements associated with the broadcast receptions within the SFN and a second set of measurements associated with the unicast receptions.

A method for wireless communication at a first base station is described. The method may include attempting to perform a handover procedure of a UE from a second base station to the first base station, determining that the UE is performing the handover procedure based on the UE participating in MBS-based communications, and transmitting a handover report to the second base station indicating that the handover procedure of the UE was attempted, where the handover report indicates information associated with the UE performing the handover based on the UE participating in the MBS-based communications.

An apparatus for wireless communication at a first base station is described. The apparatus may include a processor, memory coupled with the processor, and instructions stored in the memory. The instructions may be executable by the processor to cause the apparatus to attempt to perform a handover procedure of a UE from a second base station to the first base station, determine that the UE is performing the handover procedure based on the UE participating in MBS-based communications, and transmit a handover report to the second base station indicating that the handover procedure of the UE was attempted, where the handover report indicates information associated with the UE performing the handover based on the UE participating in the MBS-based communications.

Another apparatus for wireless communication at a first base station is described. The apparatus may include means for attempting to perform a handover procedure of a UE from a second base station to the first base station, means for determining that the UE is performing the handover procedure based on the UE participating in MBS-based communications, and means for transmitting a handover report to the second base station indicating that the handover procedure of the UE was attempted, where the handover report indicates information associated with the UE performing the handover based on the UE participating in the MBS-based communications.

A non-transitory computer-readable medium storing code for wireless communication at a first base station is described. The code may include instructions executable by a processor to attempt to perform a handover procedure of a UE from a second base station to the first base station, determine that the UE is performing the handover procedure based on the UE participating in MBS-based communications, and transmit a handover report to the second base station indicating that the handover procedure of the UE was attempted, where the handover report indicates information associated with the UE performing the handover based on the UE participating in the MBS-based communications.

Some examples of the method, apparatuses, and non-transitory computer-readable medium described herein may further include operations, features, means, or instructions for determining that the handover procedure of the UE was unsuccessful, where the handover report indicates one or more parameters associated with the handover procedure being unsuccessful.

In some examples of the method, apparatuses, and non-transitory computer-readable medium described herein, the one or more parameters include a handover failure cause associated with the UE participating in the MBS-based communications, an indication that the handover procedure was a multicast broadcast services-based handover procedure, an indication that the handover procedure involved a MBS radio bearer, a MBS-based session identifier, a MBS-based service identifier, a MBS-based radio bearer identifier, a MBS-based measurement report, an indication that the handover procedure was based on a failure associated with the MBS, or any combination thereof.

Some examples of the method, apparatuses, and non-transitory computer-readable medium described herein may further include operations, features, means, or instructions for determining that the handover procedure of the UE was successful, where the handover report indicates one or more radio link monitoring parameters of a control channel associated with the MBS-based communications.

A method for wireless communication at a first base station is described. The method may include identifying a first network load metric associated with the first base station performing unicast-based communications, identifying a second network load metric associated with the first base station performing MBS-based communications, and transmitting an indication of the first network load metric and the second network load metric to a second base station.

An apparatus for wireless communication at a first base station is described. The apparatus may include a processor, memory coupled with the processor, and instructions stored in the memory. The instructions may be executable by the processor to cause the apparatus to identify a first network load metric associated with the first base station performing unicast-based communications, identify a second network load metric associated with the first base station performing MBS-based communications, and transmit an indication of the first network load metric and the second network load metric to a second base station.

Another apparatus for wireless communication at a first base station is described. The apparatus may include means for identifying a first network load metric associated with the first base station performing unicast-based communications, means for identifying a second network load metric associated with the first base station performing MBS-based communications, and means for transmitting an indication of the first network load metric and the second network load metric to a second base station.

A non-transitory computer-readable medium storing code for wireless communication at a first base station is described. The code may include instructions executable by a processor to identify a first network load metric associated with the first base station performing unicast-based communications, identify a second network load metric associated with the first base station performing MBS-based communications, and transmit an indication of the first network load metric and the second network load metric to a second base station.

Some examples of the method, apparatuses, and non-transitory computer-readable medium described herein may further include operations, features, means, or instructions for scheduling for the unicast-based communications, the MBS-based communications, or both, based on the first network load metric, the second network load metric, or both.

Some examples of the method, apparatuses, and non-transitory computer-readable medium described herein may further include operations, features, means, or instructions for receiving, from the second base station, an indication of a third network load metric associated with the second base station performing unicast-based communications and a fourth network load metric associated with the second base station performing MBS-based communications and scheduling for the unicast-based communications, the MBS-based communications, or both, based on the first network load metric, the second network load metric, the third network load metric, the fourth network load metric, or a combination thereof.

In some examples of the method, apparatuses, and non-transitory computer-readable medium described herein, the indication includes a load per-cell level for the unicast-based communications and the multicast services-based communications, a load per-beam level for the unicast-based communications and the multicast services-based communications, a load per-slice level for the unicast-based communications and the multicast services-based communications, a load per-SFN level for the unicast-based communications and the multicast services-based communications, or any combination thereof.

DETAILED DESCRIPTION

Figure 1:
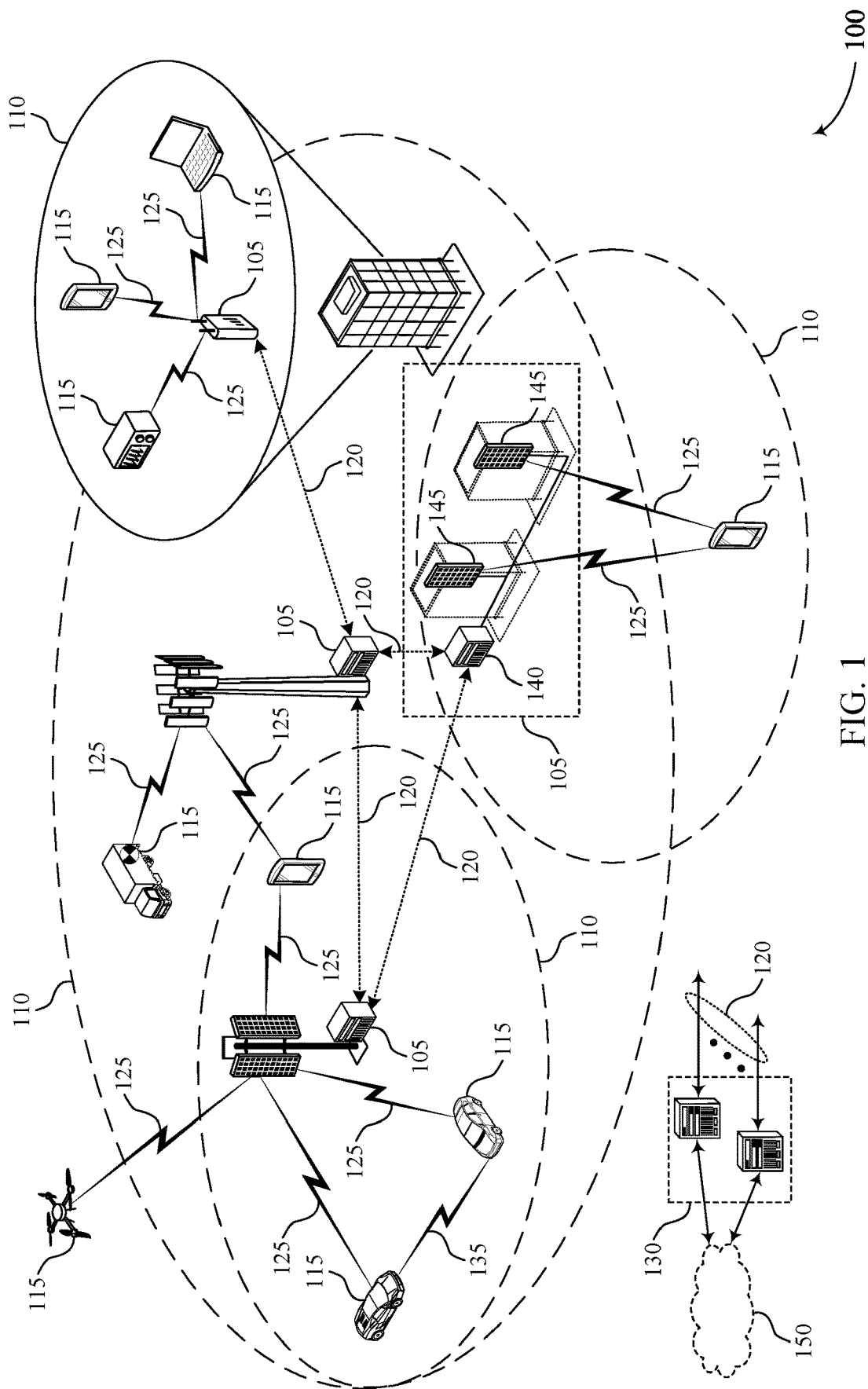
FIG. 1 illustrates an example of a wireless communications system that supports data collection enhancements for multicast broadcast services (MBS) in accordance with aspects of the present disclosure.

Multicast broadcast services (MBS) techniques are being deployed within wireless networks. The MBS protocols utilize a single-frequency network (SFN) to improve performance resulting from one or more beams, cells, and the like, used for the MBS single-frequency transmissions. These wireless networks may also support logged and/or immediate minimization of drive testing (MDT) techniques where the devices within the network exchange various measurement data to improve network performance. However, conventional wireless networks do not support or otherwise optimize MDT procedures for MBS-based communications.

Accordingly, the described techniques leverage MDT procedures to improve MBS-based communications. One example includes an MDT measurement configuration being configured that supports MBS based communications. For example, a base station may use control signaling (e.g., radio resource control (RRC) signaling) to configure a user equipment (UE) with the MDT measurement configuration. The MDT measurement configuration may support various MDT measurements within an SFN being performed for the MBS beams, cells, etc. That is, the measurement configuration may include or otherwise identify various measurements of the MBS based communications to be performed. The UE may determine the set of measurements for the SFN according to the measurement configuration and transmit an MDT report indicating the set of measurements. The base station (e.g., the network) may optimize MBS based communications based on the MDT report (e.g., scheduling decisions, allocation decisions, interference-mitigation decisions, handover decisions, and the like) based on the set of measurements.

Some aspects include improved load balancing for MBS-related communications. That is, load metrics exchanges are currently exchanged for unicast based communications. However, the described techniques include the capture and exchange of MBS-related communication metrics in addition to the unicast related communication metrics. Next Generation-Radio Access Network (NG-RAN) node (e.g., base stations) within the network may capture and share the unicast and MBS-related communication metrics and use this information to improve scheduling decisions that improve the MBS and unicast transmissions. Examples of the MBS-related communication metrics include, but are not limited to, the load level per cell for unicast and MBS, load level per beam for unicast and MBS, the load level per slice for unicast and MBS, as well as an indication of the load per SFN for MBS. Accordingly, the nodes may use the information indicated in the load balancing messages to optimize MBS-related communications in addition to unicast communications. includes improved handover procedures that support MBS based communications. For example, base stations participating in a handover procedure (or at least attempt to participate in the handover procedure) may collect and share various MBS-based metrics associated with the handover procedure. For example, in an unsuccessful handover procedure the metrics (e.g., information) may include information distinguishing MBS-related handover failures from non-MBS based handover failures (e.g., MBS-related failure causes, identifying information associated with the MBS communications, and the like). The MBS-related information included in the handover report may be used to improve handovers between MBS supporting cells, between MBS supporting cells and non-MBS supporting cells, and/or between non-MBS supporting cells and MBS supporting cells. Moreover, this may include including MBS-related measurements in the logged/immediate MDT reports as well as mobility history reports. Accordingly, handover procedures of UE from one base station to the next may be improved in the situation where the UE is performing MBS based communications within the SFN.

Some aspects improve load balancing for MBS-related communications. That is, load metrics exchanges are currently exchanged for unicast based communications. However, the described techniques include the capture and exchange of MBS-related communication metrics in addition to the unicast related communication metrics. NG-RAN node (e.g., base stations) within the network may capture and share the unicast and MBS-related communication metrics and use this information to improve scheduling decisions that improve the MBS and unicast transmissions. Examples of the MBS-related communication metrics include, but are not limited to, the load level per cell for unicast and MBS, load level per beam for unicast and MBS, the load level per slice for unicast and MBS, as well as an indication of the load per SFN for MBS. Accordingly, the nodes may use the information indicated in the load balancing messages to optimize MBS-related communications in addition to unicast communications.

Aspects of the disclosure are initially described in the context of wireless communications systems. Aspects of the disclosure are further illustrated by and described with reference to apparatus diagrams, system diagrams, and flowcharts that relate to data collection enhancements for MBS.

FIG. 1 illustrates an example of a wireless communications system 100 that supports data collection enhancements for MBS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive control signaling indicating a measurement configuration for MDT measurement and reporting supporting broadcast receptions within an SFN. The UE 115 may determine, based at least in part on the measurement configuration, a set of measurements for the SFN. The UE 115 may transmit an MDT report indicating the set of measurements.

A base station 105 may identify, for a UE 115, a measurement configuration for MDT measurement and reporting supporting broadcast receptions at the UE 115 within an SFN. The base station 105 may transmit control signaling to the UE 115 indicating the measurement configuration. The base station 105 may receive, from the UE 115, an MDT report indicating a set of measurements for the SFN determined by the UE 115.

A base station 105 (e.g., a first base station) may attempt to perform a handover procedure of a UE 115 from a second base station to the first base station. The base station 105 may determine that the UE 115 is performing the handover procedure based at least in part on the UE 115 participating in MBS-based communications. The base station 105 may transmit a handover report to the second base station indicating that the handover procedure of the UE 1115 was attempted, wherein the handover report indicates information associated with the UE 11 performing the handover based at least in part on the UE 115 participating in the MBS-based communications.

A base station 105 (e.g., a first base station) may identify a first network load metric associated with the first base station performing unicast-based communications. The base station 105 may identify a second network load metric associated with the first base station performing MBS-based communications. The base station 105 may transmit an indication of the first network load metric and the second network load metric to a second base station.

Figure 2:
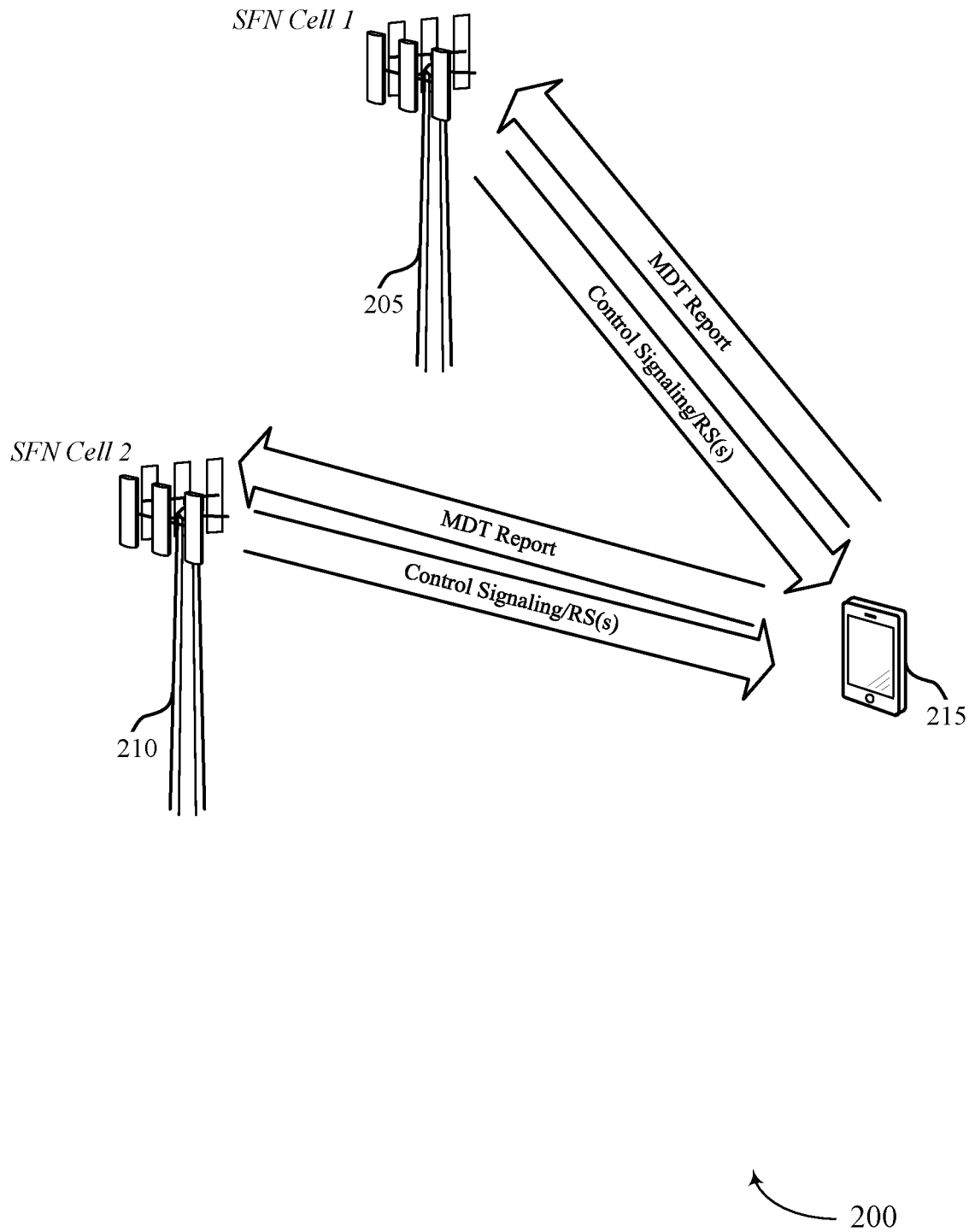
FIG. 2 illustrates an example of a wireless communications system that supports data collection enhancements for MBS in accordance with aspects of the present disclosure.

FIG. 2 illustrates an example of a wireless communications system 200 that supports data collection enhancements for MBS in accordance with aspects of the present disclosure. Wireless communications system 200 may implement aspects of wireless communications system 100. Wireless communications system 200 may include base station 205, base station 210, and UE 215, which may be examples of the corresponding devices described herein. In some aspects, base station 205 and base station 210 may be examples of one or more distributed units (DUs), one or more cells associated with a DU, and the like, performing broadcast communications with UE 215 (e.g., MBS communications, multicast communications, and the like) within an SFN.

Wireless communications system 200 may support MBS-based communications. MBS-based communications may provide for increased system efficiency and user experience (e.g., in some use cases). MBS-based communications may use an SFN to increase performance (e.g., for cell-edge UEs). The SFN may include transmission of the same waveform from multiple transmission points. SFN scenarios may include, but are not limited to, transmissions using a single beam (e.g., just beam 1, or beam 2, etc.), transmissions using multiple beams of a single unicast cell (e.g., using beams 3 and 4 of a cell, etc.), and/or transmissions from multiple unicast cells (e.g., base station 205 and base station 210). That is, base station 205 and/or base station 210 may be examples of, or representative of, one or more cells, TRPs, base stations, RHs, and the like. Base station 205 and/or base station 210 may be examples of a distributed unit (DU) components/functions within a central unit (CU)/ DU architecture.

Wireless communications system 200 may also support drive testing functionality, such as MDT. This may include UEs (such as UE 215) monitoring, measuring, or otherwise collecting various network measurements. Such measurements may include, but are not limited to, various network performance metrics, such as reference signal receive power (RSRP), reference signal strength indicator (RSSI), reference signal received quality (RSRQ), reference signal code power (RSCP), receive level(s), pilot signal phase/noise information, block level error rate (BLER), SNR, signal-to-interference-plus-noise ratio (SINR), channel state and/or quality information, cell power levels, and the like). Additionally, or alternatively, the measurements may include, but are not limited to, call drop information, throughput rates, handover performance, cell reselection performance, and the like). Such MDT measurements may be logged MDT measurements (e.g., while the UE is operating in an RRC inactive or idle modes) and/or immediate MDT measurements (e.g., while the UE is operating in an RRC active or connected mode). The UE may provide the measurement information to the network immediately (e.g., via an immediate MDT report) and/or based on an MDT availability/ MDT request/MDT report exchange (e.g., for the logged MDT measurements) between the UE and its serving base station/cell.

However, such MDT functionality is not generally configured to support MBS-based communications, which may limit MBS optimizations. For example, MBS optimizations may include optimized MBS coverage area and service quality, reduced switching failures between MBS-supporting cells and non-MBS-supporting cells, optimization of MBS-related resources, and the like. More particularly, MBS coverage and service quality enhancements may not be supported because conventional networks may not support the SFN coverage scenario, which is different from the traditional cell coverage scenarios. Moreover, logged MDT functionality framework may not support beam level measurements. Additionally, conventional networks may not support leveraging logged MDT information to reduce switching failures between MBS supporting cells and non-MBS-supporting cells, optimization of MBS-related resources, and the like.

Accordingly, aspects of the described techniques may support leveraging MDT functionality to support MBS-based communications (which may include MBS-based communications and/or other broadcast-based communications). Some aspects of the described techniques may support leveraging logged MDT measurements for broadcast mode UEs (e.g., in all RRC modes), such as when UE 215 is receiving broadcast receptions. Some aspects of the described techniques may also support leveraging MDT for multicast mode UEs (e.g., logged MDT for multicast mode UEs in RRC inactive or RRC idle). Some aspects of the described techniques may also support new event triggers for logged MDT functionality, correlating MBS-based measurements with unicast-based measurements, enhancements to immediate MDT functionality that support MBS, mobility robustness optimizations (MRO) enhancements for MBS, network load balancing for MBS, and the like.

For example, base station 205 and base station 210 may form or otherwise be components within an SFN supporting broadcast-based receptions at UE 215. Base station 205 may also be referred to as the SFN cell 1 and base station 210 may also be referred to as the SFN cell 2 within the SFN. Base station 205 (e.g., the serving base station/cell in this example) may identify or otherwise determine a measurement configuration for MDT measurement and reporting that support such broadcast communications to UE 215 (e.g., MBS receptions, broadcast receptions, multicast receptions, etc.) within the SFN. The measurement configuration may include an MDT measurement configuration. Base station 205 may transmit, provide, or otherwise convey an indication of the measurement configuration to UE 215.

For example, base station 205 may transmit the indication of the measurement configuration to UE 215 using control signaling (e.g., RRC signaling). The control signaling may indicate the measurement configuration explicitly (e.g., indicate the parameters/features to be measured and reported) and/or implicitly (e.g., indicate an index or other identifier associated with a (pre)configured measurement configuration). The control signaling may include a mixture of explicit indications and implicit indications (e.g., indicate an index or other identifier associated with a (pre)configured measurement configuration in combination with one or more other explicit parameters/features that are new and/or override (pre)configured parameters/features). In some aspects, the measurement configuration may be based on the broadcast receptions within the SFN. For example, the measurement configuration may indicate or otherwise identify broadcast-based parameters/features associated with the broadcast receptions at UE 215.

UE 215 may receive the control signaling and identify or otherwise determine the measurement configuration (e.g., the MDT measurement configuration) supporting broadcast receptions at UE 215. For example, UE 215 may receive and decode the control signaling to receiver various bits, fields, etc., used to indicate the measurement configuration. UE 215 may determine the values indicated in the bits/fields to identify or otherwise determine the measurement configuration.

Accordingly, UE 215 may measure or otherwise determine a set of measurements (e.g., MDT measurements) for the SFN according to the measurement configuration. For example, UE 215 may monitor or otherwise measure various reference signal(s) (RS)(s), synchronization signals, pilot signals, system information signals, control signals, data signals, and the like, transmitted from the base station(s)/cell(s) within the SFN. This may include UE 215 monitoring or otherwise measuring such signals from base station 205 and/or from base station 210 (e.g., the base station(s)/cell(s) within the SFN) to determine the set of measurements. Based at least in part on the measurement configuration, UE 215 may monitor or otherwise measure the signal(s) to determine the set of measurements while operating in an RRC connected mode, an RRC inactive mode, and/or an RRC idle mode. As discussed above, the set of measurements may include various parameters/features and/or performance metrics associated with the broadcast receptions at UE 215.

UE 215 may transmit, provide, or otherwise convey an MDT report to base station 205 and/or base station 210. The MDT report may carry or otherwise convey an indication of the set of measurements. For example, the MDT report may carry or otherwise convey the metrics obtained or otherwise determined based on UE 215 measuring the signal(s) transmitted from base station 205 and/or base station 210. The MDT report may carry or otherwise convey the set of measurements on a per-cell basis, on a per-beam basis, and the like. The network (e.g., base station 205 and/or base station 210) may leverage the MDT report to improve broadcast operations provided to UE 215 (and/or other UEs receiving the broadcast receptions).

Some aspects of the described techniques may include new triggering events being provided to support logged MDT functions. In one example, the logged MDT measurements collection may occur periodically and/or event triggered. That is, in some examples the logged MDT measurements (e.g., according to the measurement configuration) may occur upon an event criteria being met. One example may include the logged MDT event trigger may include an event L1 where the receive signal power level of a certain cell being less than a threshold (e.g., failing to satisfy the threshold).

However, aspects of the described techniques support new event triggers being configured that support the broadcast receptions at UE 215. This may include event triggers being configured for logged MBS MDT measurements (e.g., UE 215 may measure and log MDT measurements for broadcast and multicast UEs when a certain MBS specific event occurs). Examples of the MBS specific events may include, but are not limited to, an MBS RSRP/RSRQ/SINR below a threshold, an MBS packet data convergence protocol (PDCP) service data unit (SDU) data volume above a threshold, an MBS BLER above a threshold, and the like. Accordingly, UE 215 may identify or otherwise determine that a trigger event associated with the broadcast receptions within the SFN has satisfied a threshold (e.g., RSRP/RSRQ/SINR below the threshold, MBS PDCP SDU data volume/MBS BLER above the threshold, etc.). UE 215 may determine the set of measurements (e.g., start measuring and logging) for the broadcast receptions at UE 215.

Some aspects of the described techniques may include correlating MBS measurements with unicast measurements. This may include the NG-RAN (e.g., base station 205, which may be the serving base station/cell in this example) may configure UE 215 with MDT for MBS and unicast MDT. That is, UE 215 may receive another control signal (e.g., second control signaling, such as RRC signaling) that carries or otherwise conveys an indication of a second measurement configuration for MDT measurement and reporting supporting unicast receptions/communications. UE 215 may measure, determine, or otherwise identify a second set of measurements associated with the unicast receptions according to the unicast MDT measurement configuration. For example, for logged MDT UE 215 may, during each logged interval, measure and log unicast-based RSRP/RSRQ/etc. and MBS-based RSRP/RSRQ/SINR/etc., together. The MDT report, in this example, may include the set of measurements (e.g., the MBS/broadcast-based MDT measurements) and the second set of measurements (e.g., the unicast-based MDT measurements). The network may correlate the MBS measurements with the unicast measurements to improve such MBS/broadcast-based communications to UE 215 and, in some example, the unicast-based communications with UE 215 (e.g., improved scheduling decisions, interference management, mobility, etc.).

Some aspects of the described techniques may include immediate MDT enhancements for MBS. For example, UE 215 may measure, identify, or otherwise determine the set of measurements for the broadcast receptions within the SFN while operating in a connected mode (e.g., an RRC connected mode), such as immediate MDT measurements. In this example, UE 215 may transmit the MDT report while operating in the connected mode (e.g., the MDT report may be an immediate MDT report). The measurement configuration (e.g., the MDT measurement configuration supporting broadcast receptions at UE 215) may configured such that MBS quality-of-service (QoS) are verified by adding new immediate MDT measurements to be collected. The immediate MDT measurements supporting broadcast receptions may include an interruption time associated with a handover procedure (e.g., an interruption time during an MBS radio bearer (MRB)-to-data radio bearer (DRB) handover, point-to-point (PTP)-to-point-to-multipoint (PTM) handover, and the like). The immediate MDT measurements supporting broadcast receptions may include a data volume level (e.g., MBS PDCP SDU data volume or throughput level). The immediate MDT measurements supporting broadcast receptions may include a BLER (e.g., an MBS BLER associated with dropped or lost MBS data). The immediate MDT measurements supporting broadcast receptions may include a multicast and/or unicast transmission/retransmission ((Re)Tx) ratio (e.g., a number or success percentage of multicast and/or unicast (Re)Tx(s)). The immediate MDT measurements supporting broadcast receptions may include a switching rate (e.g., a switching rate between PTP and PTM).

Accordingly, the MDT enhancements for MBS may be leveraged to improve broadcast receptions at UE 215 based on MDT functionality being utilized for MBS/broadcast communications between the NG-RAN and UE 215.

In some aspects, additional MBS enhancements may be related to handover procedures of 215. For example, UE 215 may identify or otherwise determine (e.g., while operating in an inactive or idle mode) that a link associated with the broadcast receptions has failed. Accordingly, UE 215 may perform (or at least attempt to perform) a handover procedure from a first base station (e.g., base station 205) to a second base station (e.g., base station 210). UE 215 may transmit or otherwise provide a logged MDT report and/or a mobility history report in response to the failed link. That is, UE 215 may transmit a successful handover report that captures (e.g., indicates) lower layer issues, such as radio link management (RLM) issues during a successful handover procedure. To enhance a successful handover procedure, the successful handover report with RLM results of MBS PDCCH may be included (e.g., since the RLM of MBS may differ from unicast link RLM information).

In some examples, UE 215 may lose MBS services (e.g., due to an MRB failure) while operating in the inactive mode or idle mode. In this situation, the network may not be aware of such loss. Accordingly, aspects of the described techniques may include UE 215 including, in the logged MDT report and/or mobility history report, an indication that UE 215 has failed to receive MBS services (e.g., due to the MRB failure and/or when there is no MBS coverage). This indication may include, but is not limited to, a cell global identity (CGI) of the cell where the MBS service was last present (e.g., before the link failure), the CGI of the cell where the MBS service was lost, the time that UE 215 spent without MBS service (e.g., a failure duration), and the like.

Figure 3:
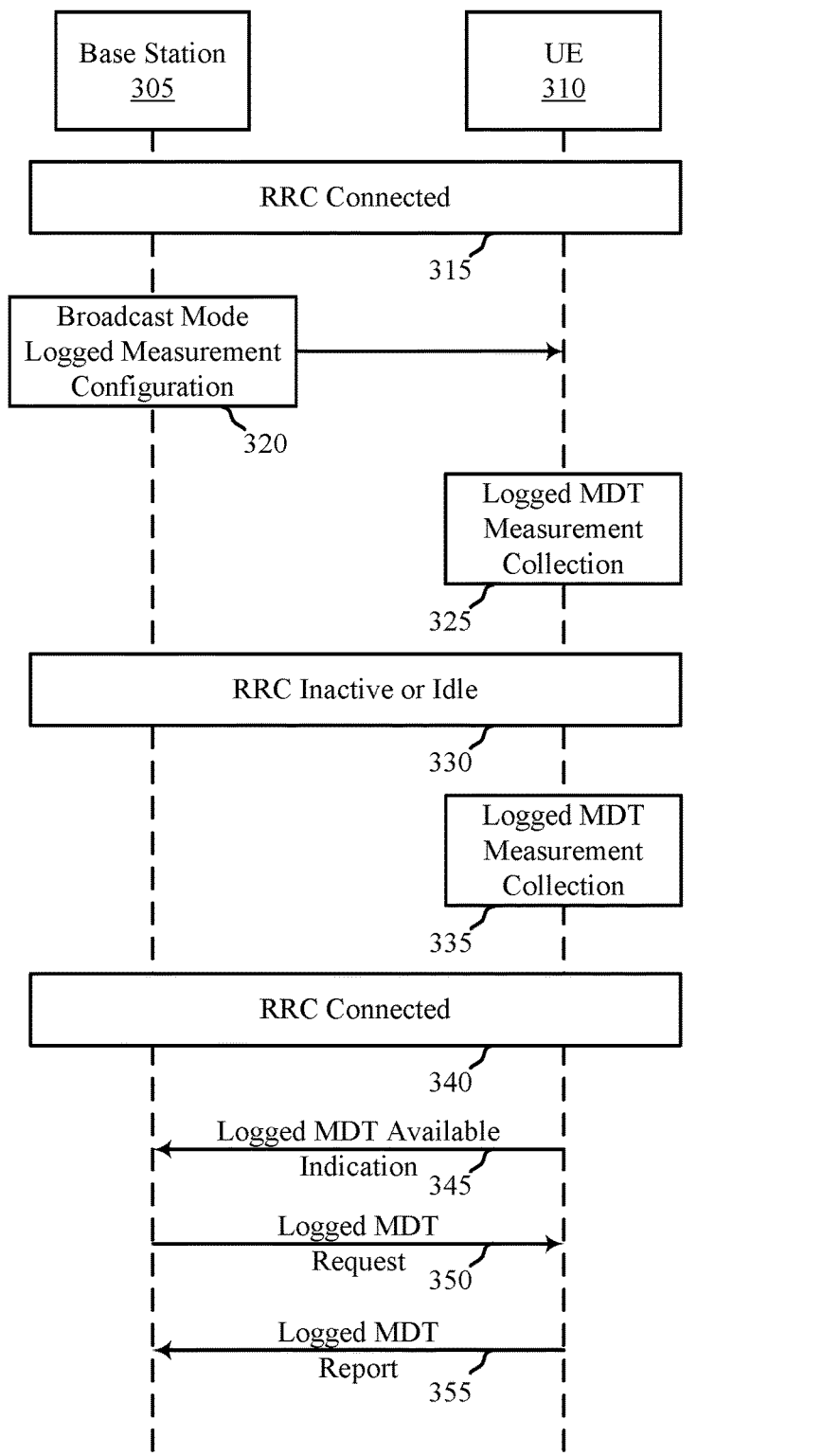
FIG. 3 illustrates an example of a process that supports data collection enhancements for MBS in accordance with aspects of the present disclosure.

FIG. 3 illustrates an example of a process 300 that supports data collection enhancements for MBS in accordance with aspects of the present disclosure. Process 300 may implement aspects of wireless communications systems 100 and/or 200. Aspects of process 300 may be implemented at or implemented by base station 305 and/or UE 310, which may be examples of the corresponding devices described herein. In some aspects, base station 305 may be performing broadcast-based communications with UE 310 within an SFN. Accordingly, process 300 illustrates an example where logged MDT measurements are supported for broadcast mode UEs, such as UE 310.

As discussed above, aspects of the described techniques provide for base station 305 to configure UE 310 with an MDT measurement configuration supporting broadcast receptions at UE 310 (e.g., MBS receptions, multicast receptions, and/or any other broadcast-based receptions). The MDT measurement configuration may include various parameters, metrics, and/or other performance-related information related to the broadcast receptions to improve MBS receptions at UE 310. UE 310 may generally measure or otherwise identify a set of measurements according to the MDT measurement configuration and transmit an MDT report to base station 310 indicating the set of measurements. Again, the MDT report may carry or otherwise convey the set of measurements related to the broadcast receptions (e.g., MBS-related information).

Accordingly, at 315, UE 310 may be operating in a connected mode (e.g., an RRC connected mode or state) with base station 305. For example, UE 310 may have performed an access procedure with base station 305 to establish one or more active radio link(s) used for communications. In some examples, one or more of the radio link(s) may be associated with an SFN used for broadcast-receptions at UE 310.

At 320, base station 305 may transmit or otherwise provide (and UE 310 may receive or otherwise obtain) control signaling (e.g., RRC signaling) indicating a measurement configuration for MDT measurement and reporting that supports broadcast receptions within the SFN. For example, base station 305 may identify or otherwise determine the measurement configuration for MDT functionality that is based, at least in some aspects, on UE 310 receiving broadcast receptions from base station 305.

In some examples, the measurement configuration may include a logged measurement configuration for broadcast mode UEs (such as UE 310). For example, the measurement configuration may carry or otherwise convey an indication of a list of target MBS areas (e.g., MBS area identifier(s), NR absolute radio frequency channel number (ARFCN), and the like) for the broadcast mode UE(s). In some examples, the measurement configuration may leverage, at least to some degree, logged measurement configuration for unicast mode UE(s) (e.g., may reuse various unicast mode MDT measurement configuration parameters for the broadcast mode UE(s)).

At 325, UE 310 may determine the set of measurements for the SFN according to the measurement configuration. For example, UE 310 may collect, identify, or otherwise determine MBS-related RSRP/RSRQ/SINR/BLER within the target MBS area. This may include intra-DU SFN measurements, intra-CU/inter-DU SFN measurements, and/or inter-CU SFN measurements. In some examples, UE 310 may collect, measure, or otherwise determine the set of measurements at the beam level (e.g., on a per-beam basis for the broadcast receptions within the SFN) logged MDT measurements either for all types of services within the target MBS area or only for MBS sessions that UE 310 is receiving (e.g., a restricted measurement scenario). In some examples and as illustrated in FIG. 3, the logged MDT measurement collection may occur while UE 310 is operating in the RRC connected mode for broadcast mode UEs (e.g., rather than only while operating in an RRC inactive or idle state or mode).

At 330, UE 310 may transition to an inactive or idle mode (e.g., RRC inactive or idle mode or state). For example, UE 310 may transition to the inactive or idle mode as part of its power savings mode to conserve energy when not actively communicating with base station 305.

At 335, UE 310 may additionally (e.g., continue) measure, identify, or otherwise determine the set of measurements for the SFN. For example, UE 310 may collect, identify, or otherwise determine MBS-related RSRP/RSRQ/SINR/BLER within the target MBS area according to the measurement configuration.

At 340, UE 310 may transition back to the connected mode (e.g., the RRC connected mode). For example, UE 310 may reestablish one or more radio link(s) with base station 305 to support wireless communications.

At 345, UE 310 may transmit or otherwise provide (and base station 305 may receive or otherwise obtain) an indication that the MDT report is available. For example, UE 310 may transmit a logged MDT available indication to base station 305 to indicate that it has logged MDT measurements to report. The logged MDT measurements in this example may be based on the set of measurements obtained while operating in the connected mode (e.g., at 325) and/or in the inactive or idle mode (e.g., at 335). In some examples, the logged MDT available indication may be transmitted or otherwise provided in control signaling, such as RRC control signaling, using a RRC reconfiguration complete (RRCReconfigComplete) message, in an RRC setup complete (RRCSetupComplete) message, in an RRC result complete (RRCResumeComplete) message, and/or in an RRC reestablishment complete RRCReestablishmentComplete) message.

At 350, base station 305 may transmit or otherwise provide (and UE 310 may receive or otherwise obtain) a logged MDT request message (e.g., in response to the logged MDT available indication). Accordingly and at 355, UE 310 may transmit or otherwise provide (and base station 305 may receive or otherwise obtain) the MDT report (e.g., a logged MDT report). In some aspects, this may also be considered a logged MBS MDT report. In some examples, UE 310 may report (e.g., in the set of measurements), for each target MBS area, the RSRP, RSRQ, SINR, signaling and/or data BLER, and the like, at the beam level granularity and based on both synchronization signal block (SSB) and CSI-RS beams within the SFN/cell. Accordingly, process 300 illustrates an example where MBS-related (e.g., broadcast mode UEs) MDT measurements are collected and reported by UE 310 to the network to improve MBS-related communications, as well as other communication types.

Figure 4:
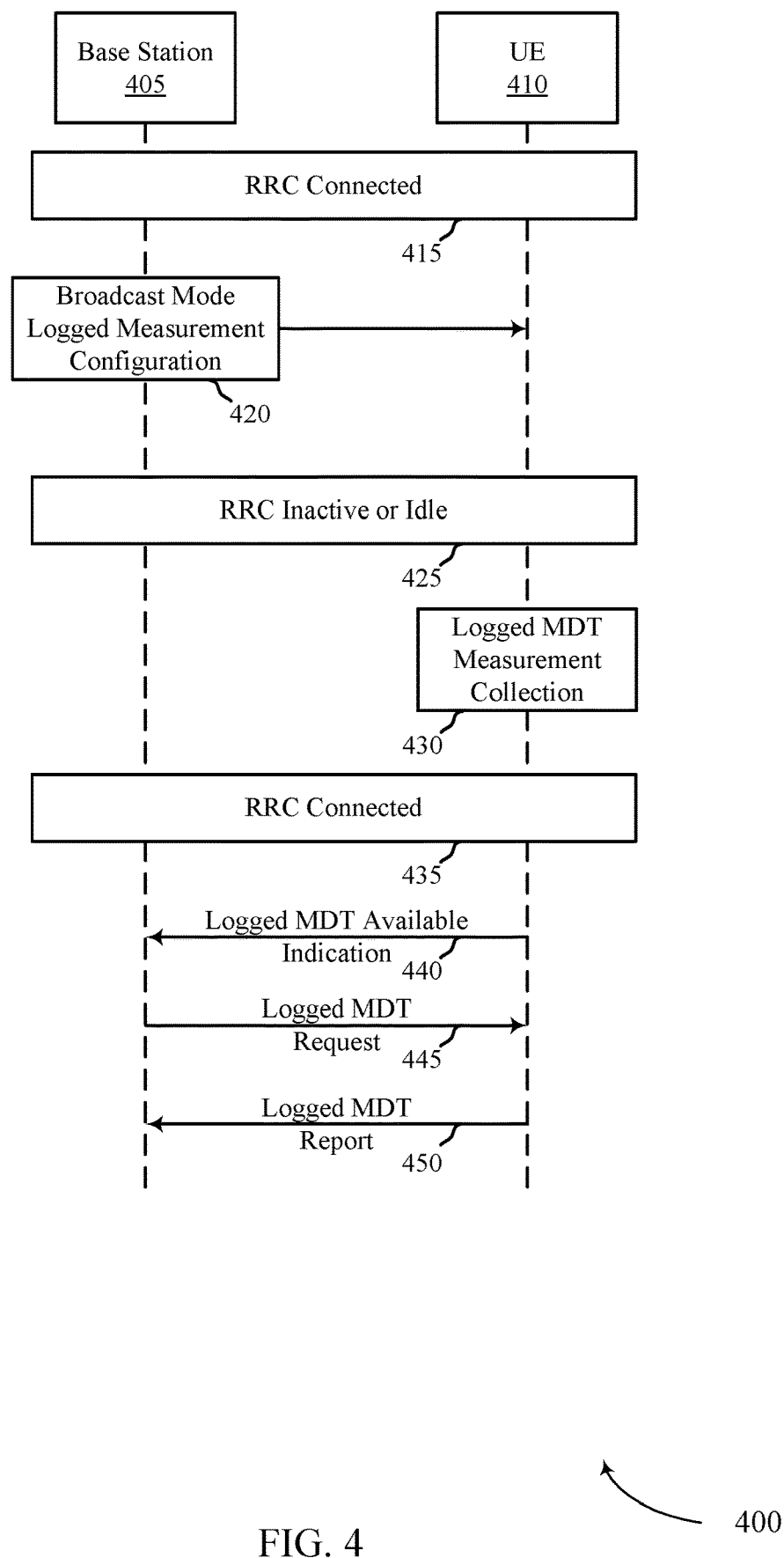
FIG. 4 illustrates an example of a process that supports data collection enhancements for MBS in accordance with aspects of the present disclosure.

FIG. 4 illustrates an example of a process 400 that supports data collection enhancements for MBS in accordance with aspects of the present disclosure. Process 400 may implement aspects of wireless communications systems 100 and/or 200. Aspects of process 400 may be implemented at or implemented by base station 405 and/or UE 410, which may be examples of the corresponding devices described herein. In some aspects, base station 405 may be performing broadcast-based communications with UE 410 within an SFN. Accordingly, process 400 illustrates an example where MDT measurements are supported for multicast mode UEs, such as UE 410.

As discussed above, aspects of the described techniques provide for base station 405 to configure UE 410 with an MDT measurement configuration supporting broadcast receptions at UE 410 (e.g., MBS receptions, multicast receptions, and/or any other broadcast-based receptions). The MDT measurement configuration may include various parameters, metrics, and/or other performance-related information related to the broadcast receptions to improve MBS receptions at UE 410. UE 410 may generally measure or otherwise identify a set of measurements according to the MDT measurement configuration and transmit an MDT report to base station 410 indicating the set of measurements. Again, the MDT report may carry or otherwise convey the set of measurements related to the broadcast receptions (e.g., MBS-related information).

Accordingly, at 415, UE 410 may be operating in a connected mode (e.g., an RRC connected mode or state) with base station 405. For example, UE 410 may have performed an access procedure with base station 405 to establish one or more active radio link(s) used for communications. In some examples, one or more of the radio link(s) may be associated with an SFN used for broadcast-receptions at UE 410.

At 420, base station 405 may transmit or otherwise provide (and UE 410 may receive or otherwise obtain) control signaling (e.g., RRC signaling) indicating a measurement configuration for MDT measurement and reporting that supports broadcast receptions within the SFN. For example, base station 405 may identify or otherwise determine the measurement configuration for MDT functionality that is based, at least in some aspects, on UE 410 receiving broadcast receptions from base station 405.

In some examples, the measurement configuration may include a logged measurement configuration for multicast mode UEs (such as UE 410). For example, the measurement configuration may carry or otherwise convey an indication of a list of target MBS areas (e.g., MBS area identifier(s), NR ARFCN, and the like) for the multicast mode UE(s). In some examples, the measurement configuration may leverage, at least to some degree, logged measurement configuration for unicast mode UE(s) (e.g., may reuse various unicast mode MDT measurement configuration parameters for the broadcast mode UE(s)).

At 425, UE 410 may transition to an inactive or idle mode (e.g., RRC inactive or idle mode or state). For example, UE 410 may transition to the inactive or idle mode as part of its power savings mode to conserve energy when not actively communicating with base station 405.

At 430, UE 410 may determine the set of measurements for the SFN according to the measurement configuration. For example, UE 410 may collect, identify, or otherwise determine MBS-related RSRP/RSRQ/SINR/BLER within the target MBS area. This may include intra-DU SFN measurements, intra-CU/inter-DU SFN measurements, and/or inter-CU SFN measurements. In some examples, UE 410 may collect, measure, or otherwise determine the set of measurements at the beam level (e.g., on a per-beam basis for the broadcast receptions within the SFN) logged MDT measurements either for all types of services within the target MBS area or only for MBS sessions that UE 410 is receiving (e.g., a restricted measurement scenario). In the example illustrated in FIG. 4, the logged MDT measurement collection may occur while UE 410 is operating in the RRC inactive or idle mode for multicast mode UEs.

At 435, UE 410 may transition back to the connected mode (e.g., the RRC connected mode). For example, UE 410 may reestablish one or more radio link(s) with base station 405 to support wireless communications.

At 440, UE 410 may transmit or otherwise provide (and base station 405 may receive or otherwise obtain) an indication that the MDT report is available. For example, UE 410 may transmit a logged MDT available indication to base station 405 to indicate that it has logged MDT measurements to report. The logged MDT measurements in this example may be based on the set of measurements obtained while operating in the inactive or idle mode (e.g., at 430). In some examples, the logged MDT available indication may be transmitted or otherwise provided in control signaling, such as RRC control signaling, using a RRC reconfiguration complete (RRCReconfigComplete) message, in an RRC setup complete (RRCSetupComplete) message, in an RRC result complete (RRCResumeComplete) message, and/or in an RRC reestablishment complete RRCReestablishmentComplete) message.

At 445, base station 405 may transmit or otherwise provide (and UE 410 may receive or otherwise obtain) a logged MDT request message (e.g., in response to the logged MDT available indication). Accordingly and at 450, UE 410 may transmit or otherwise provide (and base station 405 may receive or otherwise obtain) the MDT report (e.g., a logged MDT report). In some aspects, this may also be considered a logged MBS MDT report. In some examples, UE 410 may report (e.g., in the set of measurements), for each target MB S area, the RSRP, RSRQ, SINR, signaling and/or data BLER, and the like, at the beam level granularity and based on both SSB and CSI-RS beams within the SFN/cell. Accordingly, process 400 illustrates an example where MBS-related (e.g., multicast mode UEs) MDT measurements are collected and reported by UE 410 to the network to improve MB S-related communications, as well as other communication types. In this example, the logged MDT measurements are performed while operating in the inactive or idle mode.

Figure 5:
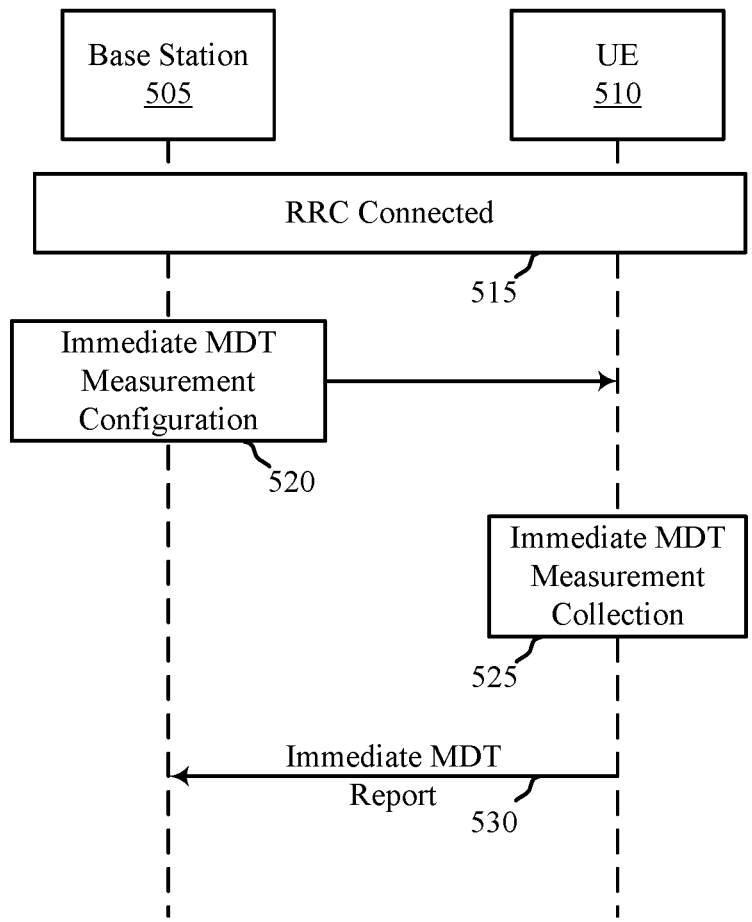
FIG. 5 illustrates an example of a process that supports data collection enhancements for MBS in accordance with aspects of the present disclosure.

FIG. 5 illustrates an example of a process 500 that supports data collection enhancements for MBS in accordance with aspects of the present disclosure. Process 500 may implement aspects of wireless communications systems 100 and/or 200. Aspects of process 500 may be implemented at or implemented by base station 505 and/or UE 510, which may be examples of the corresponding devices described herein. In some aspects, base station 505 may be performing broadcast-based communications with UE 510 within an SFN. Accordingly, process 500 illustrates an example where MDT measurements are supported for multicast mode UEs, such as UE 510.

As discussed above, aspects of the described techniques provide for base station 505 to configure UE 510 with an MDT measurement configuration supporting broadcast receptions at UE 510 (e.g., MBS receptions, multicast receptions, and/or any other broadcast-based receptions). The MDT measurement configuration may include various parameters, metrics, and/or other performance-related information related to the broadcast receptions to improve MBS receptions at UE 510. UE 510 may generally measure or otherwise identify a set of measurements according to the MDT measurement configuration and transmit an MDT report to base station 505 indicating the set of measurements. Again, the MDT report may carry or otherwise convey the set of measurements related to the broadcast receptions (e.g., MBS-related information).

Accordingly, at 515, UE 510 may be operating in a connected mode (e.g., an RRC connected mode or state) with base station 505. For example, UE 510 may have performed an access procedure with base station 505 to establish one or more active radio link(s) used for communications. In some examples, one or more of the radio link(s) may be associated with an SFN used for broadcast-receptions at UE 510.

At 520, base station 505 may transmit or otherwise provide (and UE 510 may receive or otherwise obtain) control signaling (e.g., RRC signaling) indicating a measurement configuration for MDT measurement and reporting that supports broadcast receptions within the SFN. For example, base station 505 may identify or otherwise determine the measurement configuration for MDT functionality that is based, at least in some aspects, on UE 510 receiving broadcast receptions from base station 505. In the non-limiting example illustrated in FIG. 5, the measurement configuration may be an immediate MDT measurement configuration (e.g., for immediate MDT measurements and reporting).

In some examples, the measurement configuration may include a logged measurement configuration for multicast mode UEs (such as UE 510). For example, the measurement configuration may carry or otherwise convey an indication of a list of target MBS areas (e.g., MBS area identifier(s), NR ARFCN, and the like) for the multicast mode UE(s). In some examples, the measurement configuration may leverage, at least to some degree, logged measurement configuration for unicast mode UE(s) (e.g., may reuse various unicast mode MDT measurement configuration parameters for the broadcast mode UE(s)). In some examples, the measurement configuration may include or otherwise indicate an MBS radio resource management (RRM) measurement configuration, MBS data volume configuration, and the like.

At 525, UE 510 may determine the set of measurements for the SFN according to the measurement configuration. For example, UE 510 may collect, identify, or otherwise determine MBS-related RSRP/RSRQ/SINR/BLER within the target MBS area. This may include intra-DU SFN measurements, intra-CU/inter-DU SFN measurements, and/or inter-CU SFN measurements. In some examples, UE 510 may collect, measure, or otherwise determine the set of measurements at the beam level (e.g., on a per-beam basis for the broadcast receptions within the SFN) immediate MDT measurements either for all types of services within the target MBS area or only for MBS sessions that UE 510 is receiving (e.g., a restricted measurement scenario). In the example illustrated in FIG. 5, the immediate MDT measurement collection may occur while UE 510 continues to operate in the RRC inactive or idle mode for multicast mode UEs.

At 530, UE 510 may transmit or otherwise provide (and base station 505 may receive or otherwise obtain) the MDT report (e.g., an immediate MDT report). In some aspects, this may also be considered an immediate MBS MDT report. In some examples, UE 510 may report (e.g., in the set of measurements), for each target MBS area, the RSRP, RSRQ, SINR, signaling and/or data BLER, MBS data volume, and the like, at the beam level granularity and based on both SSB and CSI-RS beams within the SFN/cell. Accordingly, process 500 illustrates an example where MB S-related (e.g., multicast mode UEs) MDT measurements are collected and reported by UE 510 to the network to improve MBS-related communications, as well as other communication types. In this example, the immediate MDT measurements are performed while operating in the connected mode and include MBS specific measurements.

Figure 6:
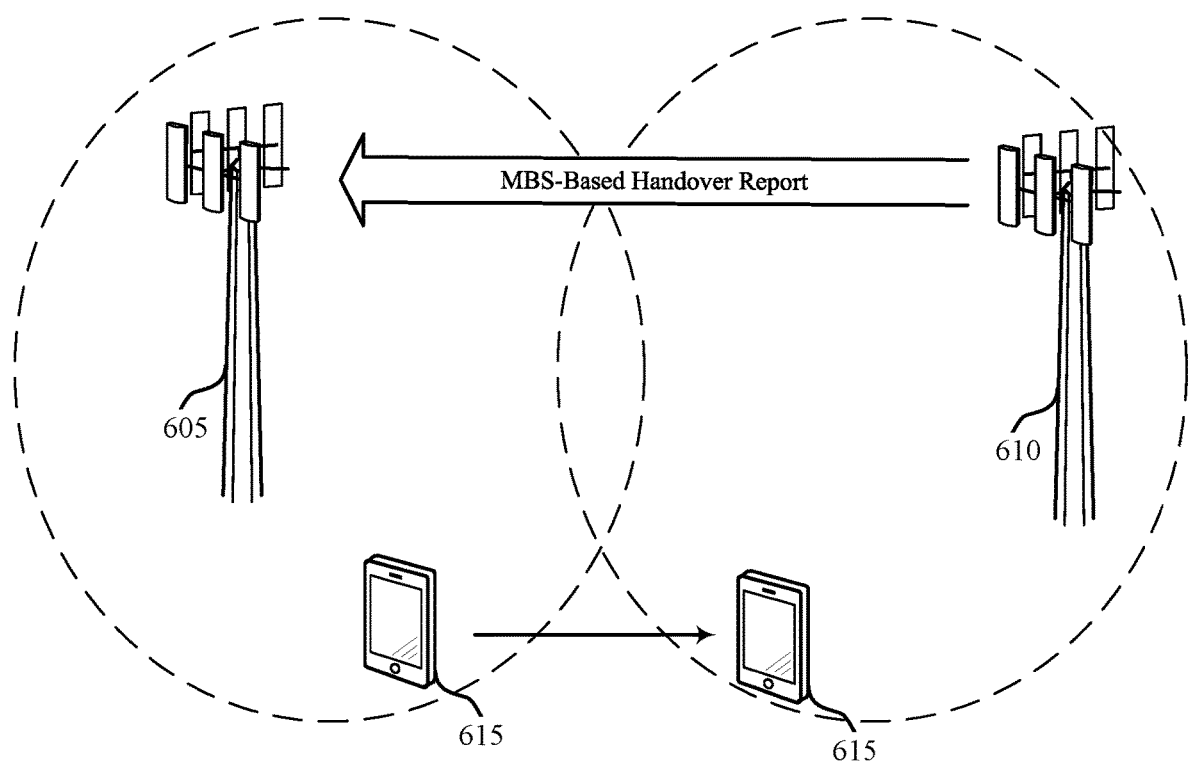
FIG. 6 illustrates an example of a wireless communications system that supports data collection enhancements for MBS in accordance with aspects of the present disclosure.

FIG. 6 illustrates an example of a wireless communications system 600 that supports data collection enhancements for MBS in accordance with aspects of the present disclosure. Wireless communications system 600 may implement aspects of wireless communications systems 100 and/or 200 and/or processes 300-500. Wireless communications system 600 may base station 605, base station 610, and/or UE 615, which may be examples of the corresponding devices described herein. In some aspects, base station 605 and base station 610 may be performing broadcast-based communications with UE 615 within an SFN. Broadly, wireless communications system 600 illustrates an example of mobility enhancements for MBS-based communications.

UE 615 may be mobile such that UE 615 may perform handovers from one base station/cell to a different base station/cell. Various scenarios may be associated with such handover procedures. For example, UE 615 may perform a handover procedure from an MBS supporting cell to a non-MBS supporting cell, from a non-MBS supporting cell to an MBS supporting cell, and/or from an MBS supporting cell to another MBS supporting cell. Moreover, for such handovers between MBS supporting cells, this may include a PTM-PTM handover, a PTM-PTP handover, and/or a PTP-PTM handover.

Generally, after such handover procedures, a handover report is sent from the target NG-RAN to the source NG-RAN (e.g., from base station 610 to base station 605 in this example). The handover report may be provided via a backhaul link (e.g., Xn/NG) to report a legacy handover failure event and/or a critical mobility problem. Such handover reports typically include the source and target cell CGIs, a radio link failure (RLF) report (e.g., if available), and the like. In some examples, the handover report may indicate the handover cause (e.g., too early handover, too late handover, a handover to a wrong cell, and the like).

However, such techniques may not distinguish MBS-related handover failures from legacy handover failures. Accordingly, such techniques may not improve reliable switching (e.g., handovers) between MBS supporting cells and non-MBS supporting cells. Accordingly, aspects of the described techniques may enhance the handover report over the Xn or NG interfaces to include MBS-related information.

For example, base station 610 (e.g., a first base station in this example) may attempt to perform the handover procedure of UE 615 from base station 605 (e.g., a second base station in this example) to base station 610. In some aspects, base station 610 may determine that the handover is an MB S-related handover procedure. For example, base station 610 may identify or otherwise determine that UE 615 is performing the handover procedure based on UE 615 participating in MBS based communications. Accordingly, base station 610 may transmit or otherwise provide (and base station 605 may receive or otherwise obtain) a handover report indicating that the handover procedure of UE 615 was attempted. In some aspects, the handover report may carry or otherwise indicate information associated with the UE performing the handover based on UE 615 participating in MBS based communications. That is, the handover report may carry or otherwise indicate MB S-related information associated with and/or based on the MBS communications.

For example, the handover report may include a new handover failure cause (e.g., an MBS-related failure cause) and/or a failure to establish MBS session resources and/or other information indicating that this was an MBS-related handover. For example, the handover report may indicate an MBS session identifier, and MBS services identifier (e.g., a temporary mobile group identifier (TMGI)), an MRB identifier, an MBS measurement results (e.g., MBS RSRP/RSRQ/SINR/BLER), and/or an MBS-related failure (e.g., a multicast RLM acknowledgement mode (AM) leg failure in the enhanced RLF report), and the like.

In the situation where base station 610 determines that the handover procedure was unsuccessful (e.g., the MBS session is unable to be established), the handover report may carry or otherwise indicate parameter(s) associated with the handover procedure being unsuccessful (e.g., the MBS handover failure cause, MBS session identifier, MRB identifier, etc.).

In the situation where base station 610 determines that the handover procedure was successful (e.g., the MBS session is established), the handover report may carry or otherwise convey RLM parameter(s) of the control channel (e.g., PDCCH) associated with the MBS based communications.

Figure 7:
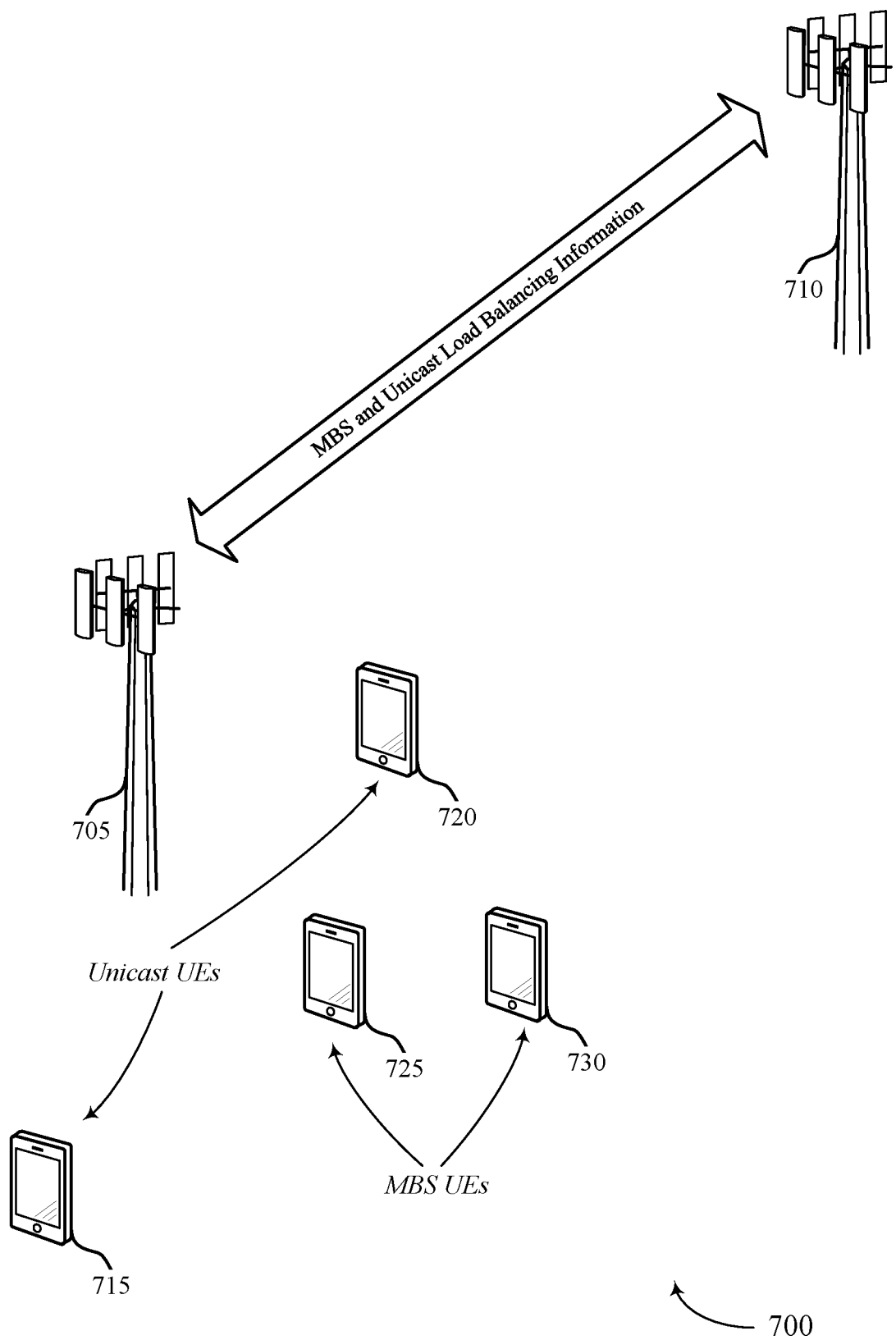
FIG. 7 illustrates an example of a wireless communications system that supports data collection enhancements for MBS in accordance with aspects of the present disclosure.

FIG. 7 illustrates an example of a wireless communications system 700 that supports data collection enhancements for MBS in accordance with aspects of the present disclosure. Wireless communications system 700 may implement aspects of wireless communications systems 100, 200, and/or 600 and/or processes 300-500. Wireless communications system 700 may base station 705, base station 710, UE 715, UE 720, UE 725, and/or UE 730, which may be examples of the corresponding devices described herein. Broadly, wireless communications system 700 illustrates an example of load balancing enhancements for MBS based communications.

Base station 705 and/or base station 710 generally perform load balancing to improve unicast communications. For example, base station 705 and base station 710 may exchange various messages related to load levels to optimize scheduling decisions, among others, for the unicast communications. However, such load balancing techniques generally do not include MBS-related information usable to optimize MBS based communications.

Accordingly, aspects of wireless communications system 700 may support load balancing enhancements for MBS. This may include efficient multiplexing of PTM traffic with PTP transmissions in the frequency and time domain by performing load balancing based on MBS.

For example, base station 705 (e.g., a first base station in this example) may identify or otherwise determine a first network load metric associated with base station 705 performing unicast based communications. That is, base station 705 may be performing unicast-based communications with UE 715 and UE 720. Base station 705 may identify or otherwise determine the first network load metric based on the unicast based communications with these UEs.

Base station 705 may also identify or otherwise determine a second network load metric associated with base station 705 performing MBS based communications. That is, base station 705 may be performing MBS based communications with UE 725 and UE 730. Base station 705 may identify or otherwise determine the second network load metric based on the MBS based communications with these UEs.

Base station 705 may transmit or otherwise provide (and base station 710, the second base station in this example, may receive or otherwise obtain) an indication of the first network load metric and the second network load metric. For example, base station 705 and base station 710 may exchange load metrics per-unicast and MBS services (e.g., per MBS session) on various network interfaces (e.g., Xn, NG, X2, S1, etc.). This may include such load balancing information being exchanged via resource status request/response/update messages.

Examples of the indication of the first and second network load metrics may include, but are not limited to, a load per cell level for the unicast based communications and for the MBS based communications, the load per beam level for the unicast communications and for the MBS based communications, the load per slice level for the unicast based communications and for the MBS based communications, the load per SFN level for the MBS based communications, and the like. Accordingly, base station 705 may schedule for the unicast and/or MBS based communications based on the first and second network load metrics.

Similarly, base station 710 may also collect and report the first and second network load metrics for UEs within its coverage area to base station 705. In this situation, base station 705 and base station 710 may both make scheduling decisions based on their own network load metrics as well as network load metrics received from other base stations (e.g., which include the MBS-related load level information).

Figure 8:
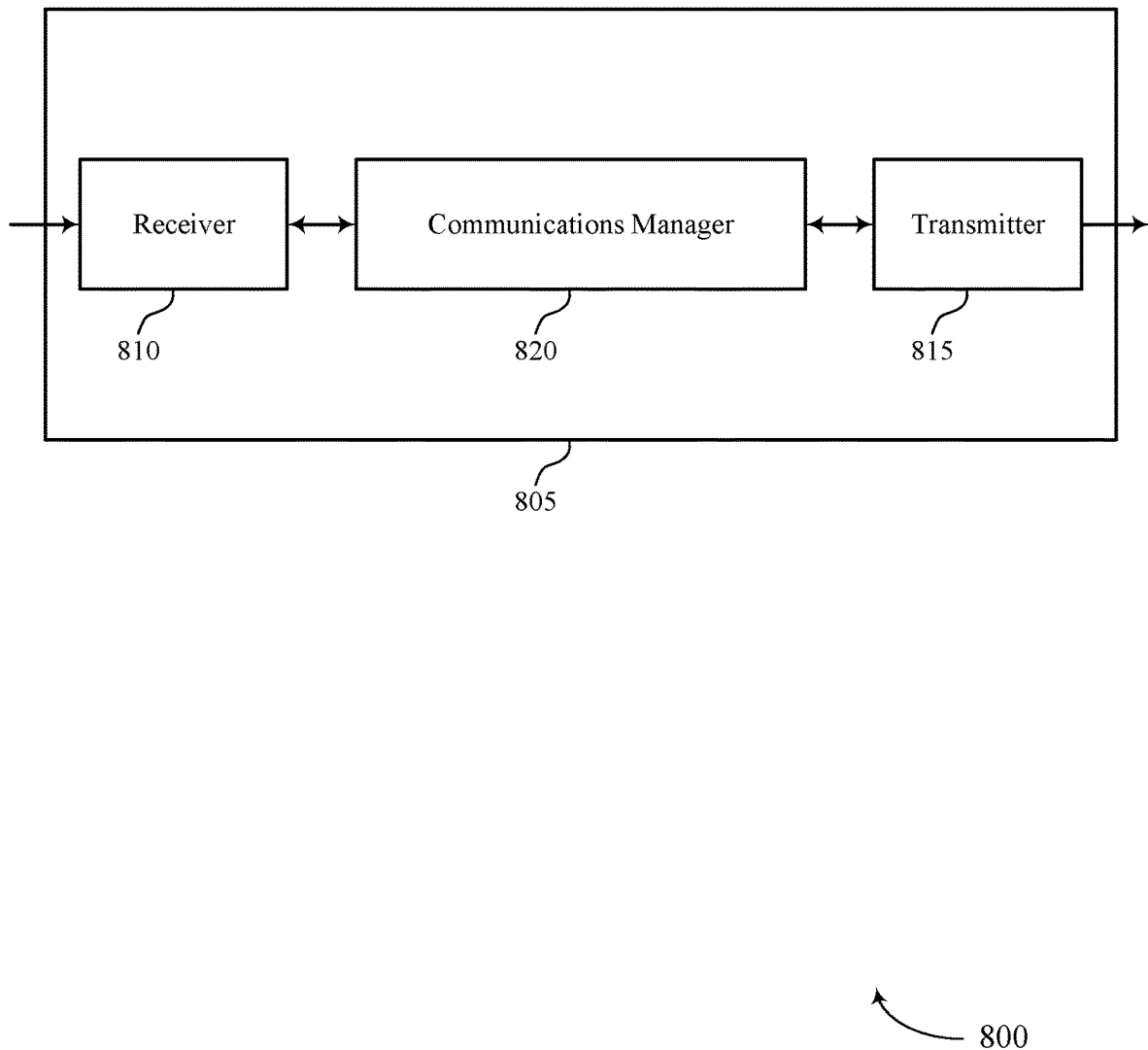
FIGS. 8 and 9 show block diagrams of devices that support data collection enhancements for MBS in accordance with aspects of the present disclosure.

FIG. 8 shows a block diagram 800 of a device 805 that supports data collection enhancements for MBS in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to data collection enhancements for MBS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to data collection enhancements for MBS). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of data collection enhancements for MBS as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving control signaling indicating a measurement configuration for MDT measurement and reporting supporting broadcast receptions within an SFN. The communications manager 820 may be configured as or otherwise support a means for determining, based on the measurement configuration, a set of measurements for the SFN. The communications manager 820 may be configured as or otherwise support a means for transmitting an MDT report indicating the set of measurements.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for MBS enhancements within an SFN utilizing various MDT techniques, handover procedures based on MBS communications, and/or network load balancing that includes MBS-related load levels.

Figure 9:
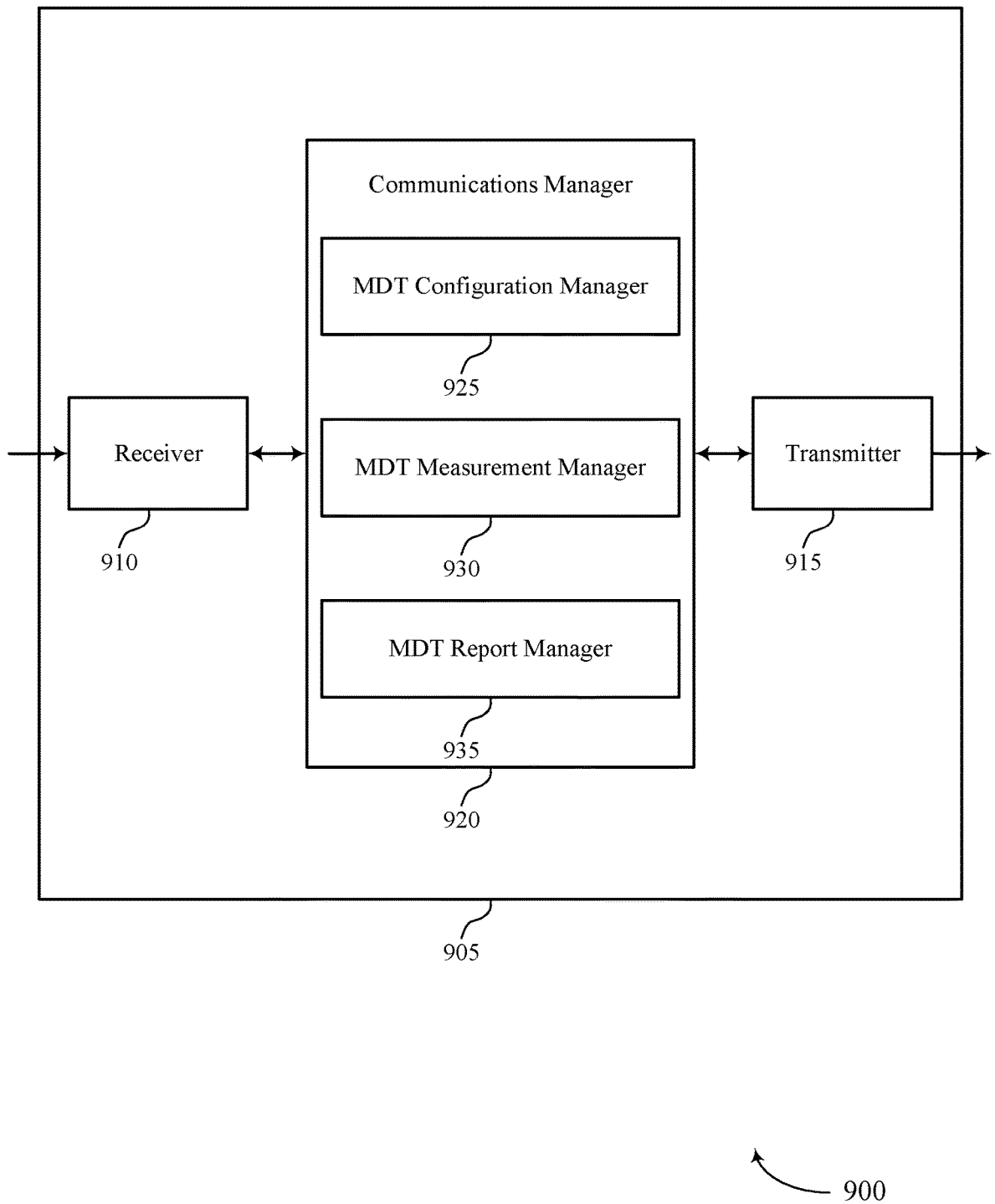

FIG. 9 shows a block diagram 900 of a device 905 that supports data collection enhancements for MBS in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to data collection enhancements for MBS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to data collection enhancements for MBS). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of data collection enhancements for MBS as described herein. For example, the communications manager 920 may include an MDT configuration manager 925, an MDT measurement manager 930, an MDT report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The MDT configuration manager 925 may be configured as or otherwise support a means for receiving control signaling indicating a measurement configuration for MDT measurement and reporting supporting broadcast receptions within an SFN. The MDT measurement manager 930 may be configured as or otherwise support a means for determining, based on the measurement configuration, a set of measurements for the SFN. The MDT report manager 935 may be configured as or otherwise support a means for transmitting an MDT report indicating the set of measurements.

Figure 10:
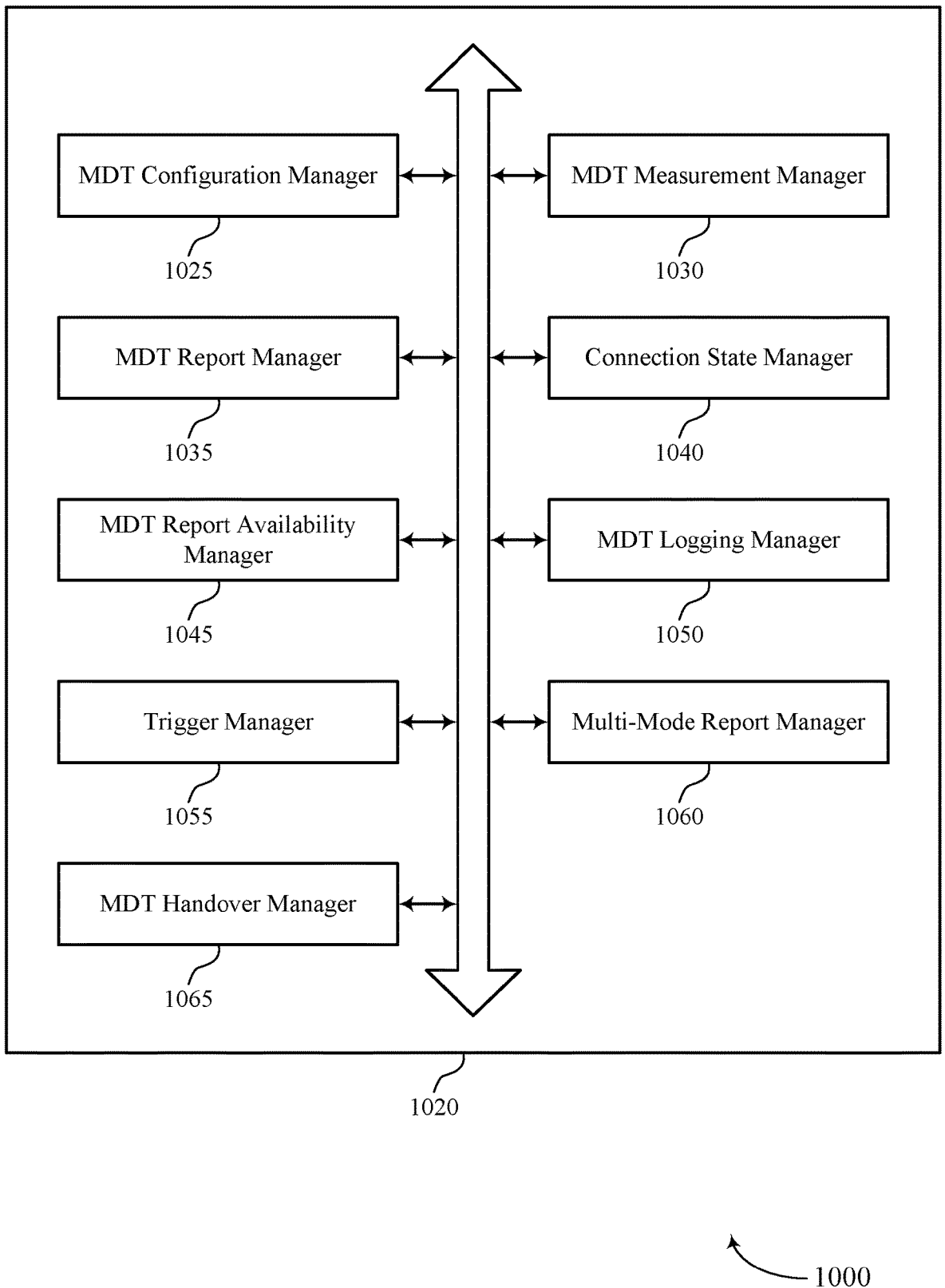
FIG. 10 shows a block diagram of a communications manager that supports data collection enhancements for MBS in accordance with aspects of the present disclosure.

FIG. 10 shows a block diagram 1000 of a communications manager 1020 that supports data collection enhancements for MBS in accordance with aspects of the present disclosure. The communications manager 1020 may be an example of aspects of a communications manager 820, a communications manager 920, or both, as described herein. The communications manager 1020, or various components thereof, may be an example of means for performing various aspects of data collection enhancements for MBS as described herein. For example, the communications manager 1020 may include an MDT configuration manager 1025, an MDT measurement manager 1030, an MDT report manager 1035, a connection state manager 1040, an MDT report availability manager 1045, an MDT logging manager 1050, a trigger manager 1055, a multi-mode report manager 1060, an MDT handover manager 1065, or any combination thereof. Each of these components may communicate, directly or indirectly, with one another (e.g., via one or more buses).

The communications manager 1020 may support wireless communication at a UE in accordance with examples as disclosed herein. The MDT configuration manager 1025 may be configured as or otherwise support a means for receiving control signaling indicating a measurement configuration for MDT measurement and reporting supporting broadcast receptions within an SFN. The MDT measurement manager 1030 may be configured as or otherwise support a means for determining, based on the measurement configuration, a set of measurements for the SFN. The MDT report manager 1035 may be configured as or otherwise support a means for transmitting an MDT report indicating the set of measurements.

In some examples, the connection state manager 1040 may be configured as or otherwise support a means for performing the minimization of dive test measurements of the SFN used for the broadcast receptions while operating in a connected mode, where the set of measurements are based on the MDT measurements performed while operating in the connected mode. In some examples, the connection state manager 1040 may be configured as or otherwise support a means for transmitting the MDT report while operating in the connected mode. In some examples, the MDT report indicates an interruption time associated with a handover procedure, a data volume level, a multicast transmission/retransmission success ratio, a unicast transmission/retransmission success ratio, a switching rate, or a combination thereof.

In some examples, the connection state manager 1040 may be configured as or otherwise support a means for performing the minimization of dive test measurements of the SFN while operating in an inactive mode or an idle mode, where the set of measurements are based on the MDT measurements.

In some examples, the MDT report availability manager 1045 may be configured as or otherwise support a means for transmitting, based on the broadcast receptions within the SFN, an indication that the MDT report is available.

In some examples, the MDT logging manager 1050 may be configured as or otherwise support a means for logging the MDT measurements performed while operating in an inactive mode or an idle mode to obtain logged MDT measurements that support broadcast receptions within the SFN. In some examples, the MDT report indicates the set of measurements on a per-beam basis for the broadcast receptions within the SFN.

In some examples, the trigger manager 1055 may be configured as or otherwise support a means for identifying a trigger event associated with the broadcast receptions within the SFN that has satisfied a threshold, where determining the set of measurements is triggered based on the trigger event satisfying the threshold. In some examples, the trigger event is based on at least one of a reference signal received power level, a reference signal received quality level, a signal-to-interference-to-noise level, a data volume, a block level error rate, or a combination, for the broadcast receptions within the SFN.

In some examples, the multi-mode report manager 1060 may be configured as or otherwise support a means for receiving a second control signaling indicating a second measurement configuration for MDT measurement and reporting supporting unicast receptions. In some examples, the multi-mode report manager 1060 may be configured as or otherwise support a means for determining, based on the second control signaling, a second set of measurements associated with the unicast receptions, where the MDT report indicates the set of measurements associated with the broadcast receptions within the SFN and the second set of measurements associated with the unicast receptions.

In some examples, the MDT handover manager 1065 may be configured as or otherwise support a means for determining, while operating in an inactive mode or an idle mode, that a link associated with the broadcast receptions has failed. In some examples, the MDT handover manager 1065 may be configured as or otherwise support a means for performing a handover procedure of the UE to a first base station from a second base station based on the failed link. In some examples, the MDT handover manager 1065 may be configured as or otherwise support a means for transmitting a logged MDT report or a mobility history report based on the failed link.

In some examples, the logged MDT report or the mobility history report includes an indication that the broadcast receptions failed at the UE, an indication of an identifier of the cell associated with the failed link, a failure duration associated with the failed link, or any combination thereof.

Figure 11:
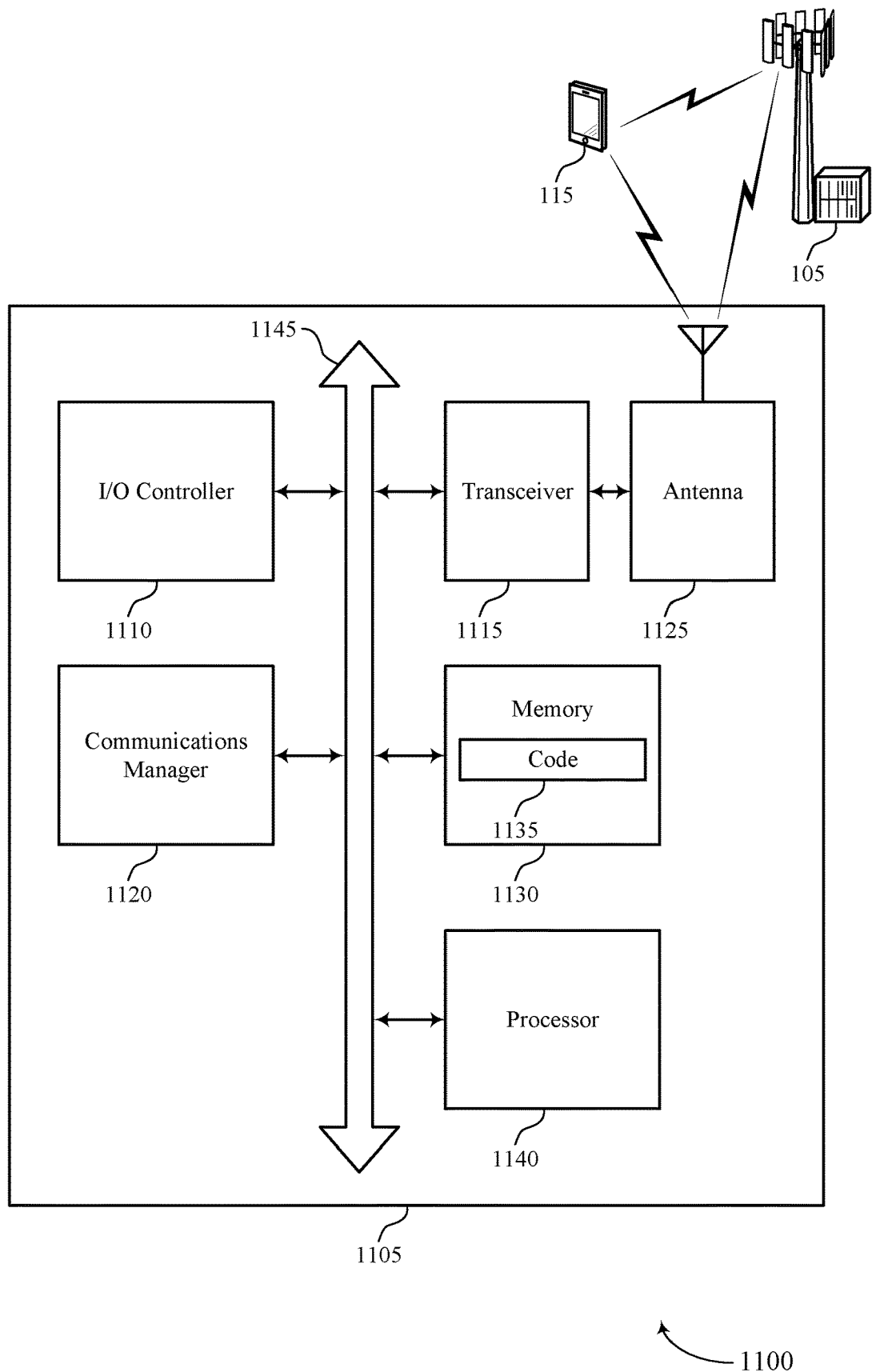
FIG. 11 shows a diagram of a system including a device that supports data collection enhancements for MBS in accordance with aspects of the present disclosure.

FIG. 11 shows a diagram of a system 1100 including a device 1105 that supports data collection enhancements for MBS in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting data collection enhancements for MBS). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving control signaling indicating a measurement configuration for MDT measurement and reporting supporting broadcast receptions within an SFN. The communications manager 1120 may be configured as or otherwise support a means for determining, based on the measurement configuration, a set of measurements for the SFN. The communications manager 1120 may be configured as or otherwise support a means for transmitting an MDT report indicating the set of measurements.

By including or configuring the communications manager 1120 in accordance with examples as described herein, the device 1105 may support techniques for MBS enhancements within an SFN utilizing various MDT techniques, handover procedures based on MBS communications, and/or network load balancing that includes MBS-related load levels.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of data collection enhancements for MBS as described herein, or the processor 1140 and the memory 1130 may be otherwise configured to perform or support such operations.

Figure 12:
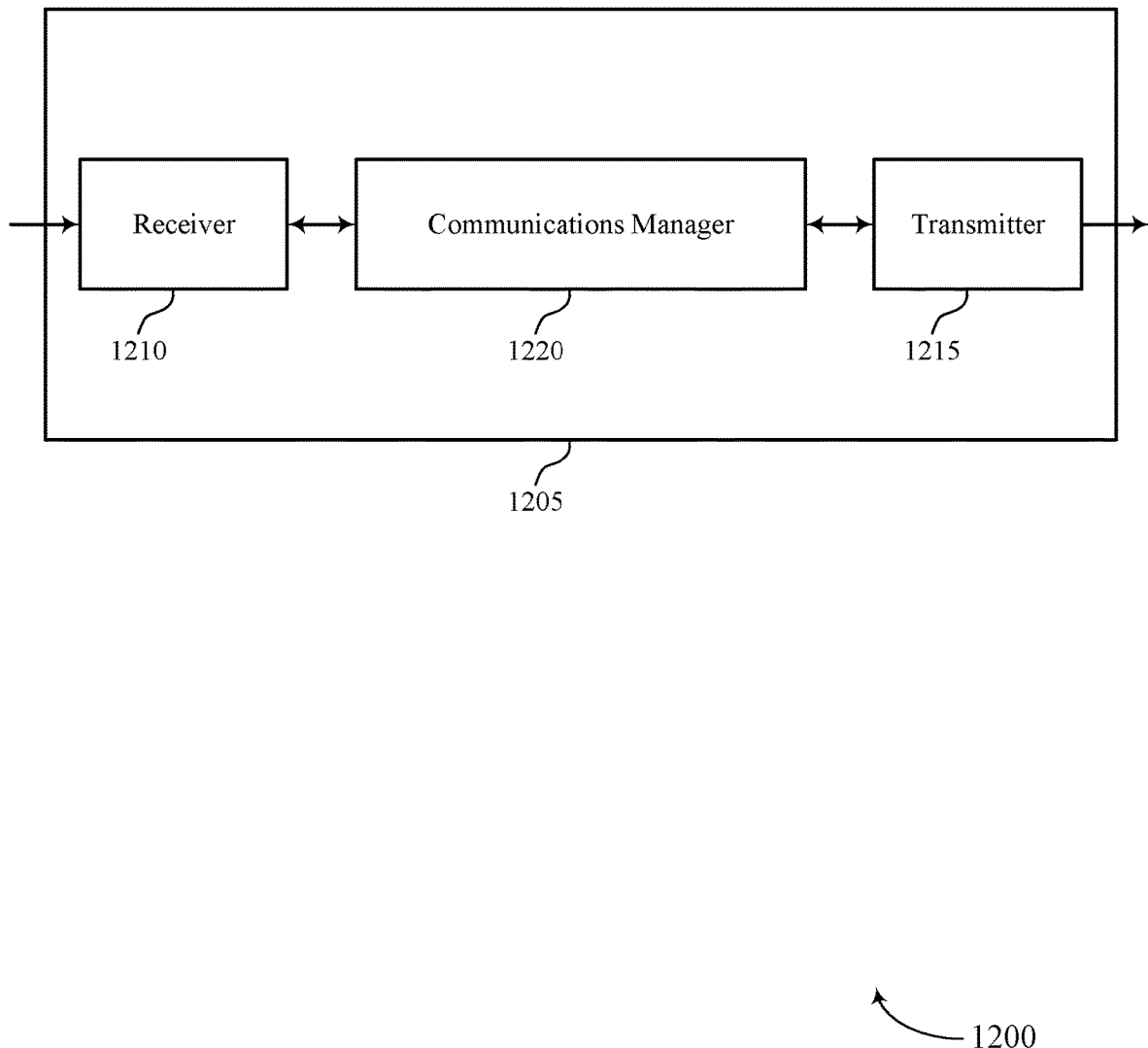
FIGS. 12 and 13 show block diagrams of devices that support data collection enhancements for MBS in accordance with aspects of the present disclosure.

FIG. 12 shows a block diagram 1200 of a device 1205 that supports data collection enhancements for MBS in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to data collection enhancements for MBS). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to data collection enhancements for MBS). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of data collection enhancements for MBS as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for identifying, for a UE, a measurement configuration for MDT measurement and reporting supporting broadcast receptions at the UE within an SFN. The communications manager 1220 may be configured as or otherwise support a means for transmitting control signaling to the UE indicating the measurement configuration. The communications manager 1220 may be configured as or otherwise support a means for receiving, from the UE, an MDT report indicating a set of measurements for the SFN determined by the UE.

Additionally, or alternatively, the communications manager 1220 may support wireless communication at a first base station in accordance with examples as disclosed herein. For example, the communications manager 1220 may be configured as or otherwise support a means for attempting to perform a handover procedure of a UE from a second base station to the first base station. The communications manager 1220 may be configured as or otherwise support a means for determining that the UE is performing the handover procedure based on the UE participating in MBS-based communications. The communications manager 1220 may be configured as or otherwise support a means for transmitting a handover report to the second base station indicating that the handover procedure of the UE was attempted, where the handover report indicates information associated with the UE performing the handover based on the UE participating in the MBS-based communications.

Additionally, or alternatively, the communications manager 1220 may support wireless communication at a first base station in accordance with examples as disclosed herein. For example, the communications manager 1220 may be configured as or otherwise support a means for identifying a first network load metric associated with the first base station performing unicast-based communications. The communications manager 1220 may be configured as or otherwise support a means for identifying a second network load metric associated with the first base station performing MBS-based communications. The communications manager 1220 may be configured as or otherwise support a means for transmitting an indication of the first network load metric and the second network load metric to a second base station.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for MBS enhancements within an SFN utilizing various MDT techniques, handover procedures based on MBS communications, and/or network load balancing that includes MBS-related load levels.

Figure 13:
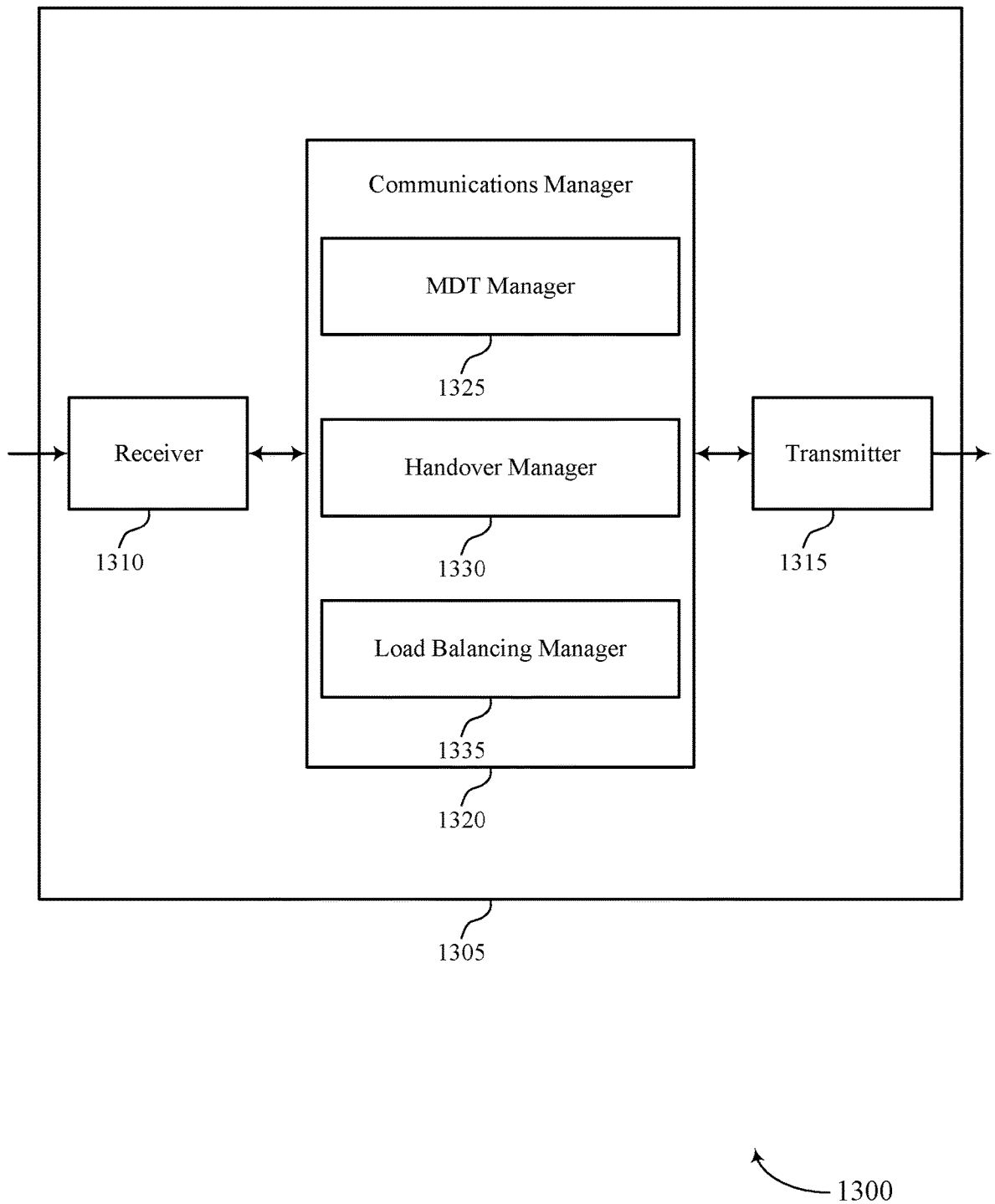

FIG. 13 shows a block diagram 1300 of a device 1305 that supports data collection enhancements for MBS in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to data collection enhancements for MB S). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to data collection enhancements for MB S). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of data collection enhancements for MBS as described herein. For example, the communications manager 1320 may include an MDT manager 1325, a handover manager 1330, a load balancing manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The MDT manager 1325 may be configured as or otherwise support a means for identifying, for a UE, a measurement configuration for MDT measurement and reporting supporting broadcast receptions at the UE within an SFN. The MDT manager 1325 may be configured as or otherwise support a means for transmitting control signaling to the UE indicating the measurement configuration. The MDT manager 1325 may be configured as or otherwise support a means for receiving, from the UE, an MDT report indicating a set of measurements for the SFN determined by the UE.

Additionally, or alternatively, the communications manager 1320 may support wireless communication at a first base station in accordance with examples as disclosed herein. The handover manager 1330 may be configured as or otherwise support a means for attempting to perform a handover procedure of a UE from a second base station to the first base station. The handover manager 1330 may be configured as or otherwise support a means for determining that the UE is performing the handover procedure based on the UE participating in MBS-based communications. The handover manager 1330 may be configured as or otherwise support a means for transmitting a handover report to the second base station indicating that the handover procedure of the UE was attempted, where the handover report indicates information associated with the UE performing the handover based on the UE participating in the MBS-based communications.

Additionally, or alternatively, the communications manager 1320 may support wireless communication at a first base station in accordance with examples as disclosed herein. The load balancing manager 1335 may be configured as or otherwise support a means for identifying a first network load metric associated with the first base station performing unicast-based communications. The load balancing manager 1335 may be configured as or otherwise support a means for identifying a second network load metric associated with the first base station performing MBS-based communications. The load balancing manager 1335 may be configured as or otherwise support a means for transmitting an indication of the first network load metric and the second network load metric to a second base station.

Figure 14:
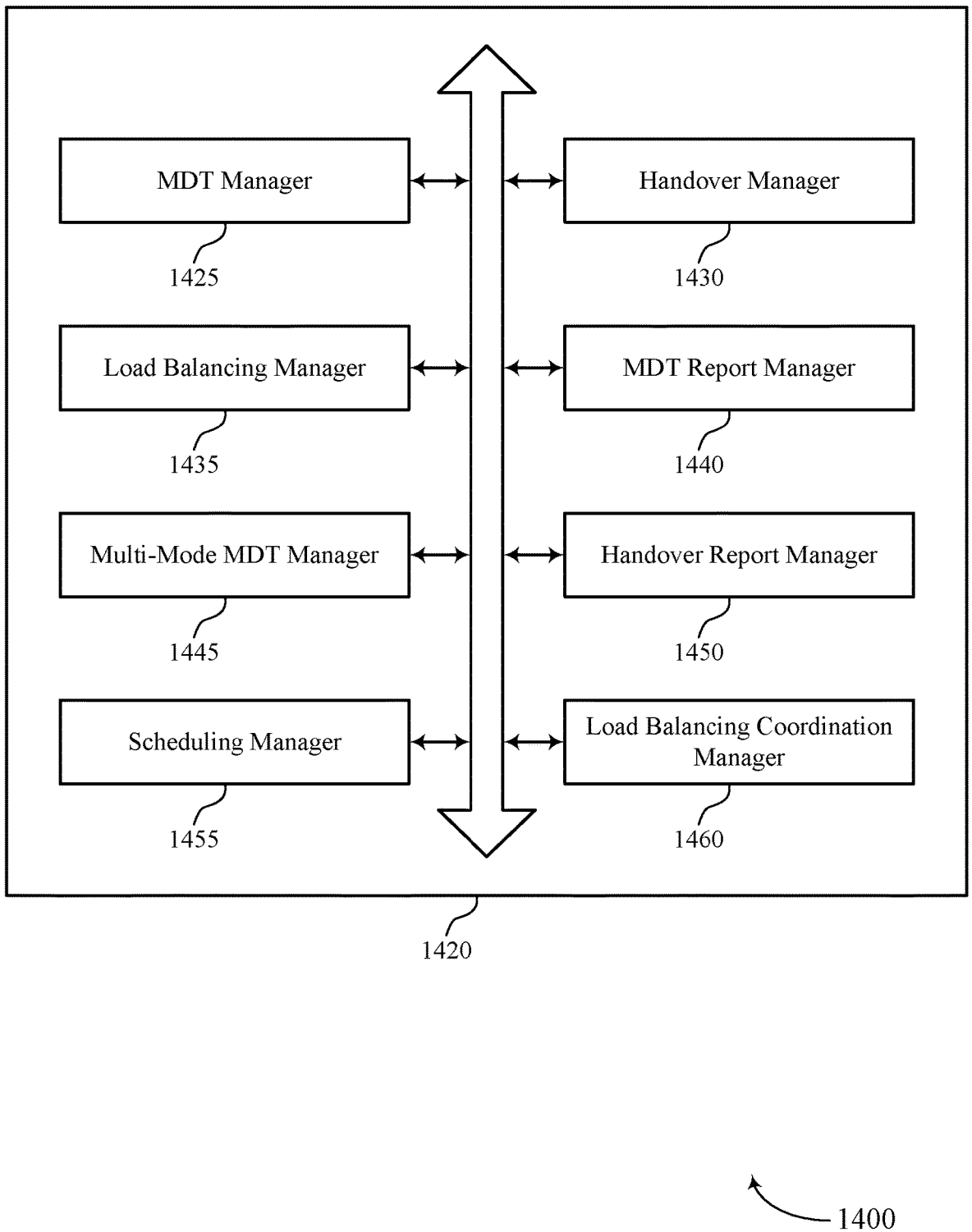
FIG. 14 shows a block diagram of a communications manager that supports data collection enhancements for MBS in accordance with aspects of the present disclosure.

FIG. 14 shows a block diagram 1400 of a communications manager 1420 that supports data collection enhancements for MBS in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of data collection enhancements for MBS as described herein. For example, the communications manager 1420 may include an MDT manager 1425, a handover manager 1430, a load balancing manager 1435, an MDT report manager 1440, a multi-mode MDT manager 1445, a handover report manager 1450, a scheduling manager 1455, a load balancing coordination manager 1460, or any combination thereof. Each of these components may communicate, directly or indirectly, with one another (e.g., via one or more buses).

The communications manager 1420 may support wireless communication at a base station in accordance with examples as disclosed herein. The MDT manager 1425 may be configured as or otherwise support a means for identifying, for a UE, a measurement configuration for MDT measurement and reporting supporting broadcast receptions at the UE within an SFN. In some examples, the MDT manager 1425 may be configured as or otherwise support a means for transmitting control signaling to the UE indicating the measurement configuration. In some examples, the MDT manager 1425 may be configured as or otherwise support a means for receiving, from the UE, an MDT report indicating a set of measurements for the SFN determined by the UE.

In some examples, the MDT report manager 1440 may be configured as or otherwise support a means for receiving the MDT report while the UE is operating in a connected mode. In some examples, the MDT report indicates an interruption time associated with a handover procedure, a data volume level, a multicast transmission/retransmission success ratio, a unicast transmission/retransmission success ratio, a switching rate, or a combination thereof.

In some examples, the MDT report manager 1440 may be configured as or otherwise support a means for receiving, based on the broadcast receptions within the SFN, an indication that the MDT report is available. In some examples, the MDT report indicates the set of measurements on a per-beam basis for the broadcast receptions within the SFN.

In some examples, the multi-mode MDT manager 1445 may be configured as or otherwise support a means for receiving a second control signaling indicating a second measurement configuration for MDT measurement and reporting supporting unicast receptions, where the MDT report indicates the set of measurements associated with the broadcast receptions within the SFN and a second set of measurements associated with the unicast receptions.

Additionally, or alternatively, the communications manager 1420 may support wireless communication at a first base station in accordance with examples as disclosed herein. The handover manager 1430 may be configured as or otherwise support a means for attempting to perform a handover procedure of a UE from a second base station to the first base station. In some examples, the handover manager 1430 may be configured as or otherwise support a means for determining that the UE is performing the handover procedure based on the UE participating in MBS-based communications. In some examples, the handover manager 1430 may be configured as or otherwise support a means for transmitting a handover report to the second base station indicating that the handover procedure of the UE was attempted, where the handover report indicates information associated with the UE performing the handover based on the UE participating in the MBS-based communications.

In some examples, the handover report manager 1450 may be configured as or otherwise support a means for determining that the handover procedure of the UE was unsuccessful, where the handover report indicates one or more parameters associated with the handover procedure being unsuccessful. In some examples, the one or more parameters include a handover failure cause associated with the UE participating in the MBS-based communications, an indication that the handover procedure was a multicast broadcast services-based handover procedure, an indication that the handover procedure involved an MBS radio bearer, an MBS-based session identifier, an MBS-based service identifier, an MBS-based radio bearer identifier, an MBS-based measurement report, an indication that the handover procedure was based on a failure associated with the MBS, or any combination thereof.

In some examples, the handover report manager 1450 may be configured as or otherwise support a means for determining that the handover procedure of the UE was successful, where the handover report indicates one or more radio link monitoring parameters of a control channel associated with the MBS-based communications.

Additionally, or alternatively, the communications manager 1420 may support wireless communication at a first base station in accordance with examples as disclosed herein. The load balancing manager 1435 may be configured as or otherwise support a means for identifying a first network load metric associated with the first base station performing unicast-based communications. In some examples, the load balancing manager 1435 may be configured as or otherwise support a means for identifying a second network load metric associated with the first base station performing MBS-based communications. In some examples, the load balancing manager 1435 may be configured as or otherwise support a means for transmitting an indication of the first network load metric and the second network load metric to a second base station.

In some examples, the scheduling manager 1455 may be configured as or otherwise support a means for scheduling for the unicast-based communications, the MBS-based communications, or both, based on the first network load metric, the second network load metric, or both.

In some examples, the load balancing coordination manager 1460 may be configured as or otherwise support a means for receiving, from the second base station, an indication of a third network load metric associated with the second base station performing unicast-based communications and a fourth network load metric associated with the second base station performing MBS-based communications. In some examples, the load balancing coordination manager 1460 may be configured as or otherwise support a means for scheduling for the unicast-based communications, the MBS-based communications, or both, based on the first network load metric, the second network load metric, the third network load metric, the fourth network load metric, or a combination thereof.

In some examples, the indication includes a load per-cell level for the unicast-based communications and the multicast services-based communications, a load per-beam level for the unicast-based communications and the multicast services-based communications, a load per-slice level for the unicast-based communications and the multicast services-based communications, a load per-SFN level for the unicast-based communications and the multicast services-based communications, or any combination thereof.

Figure 15:
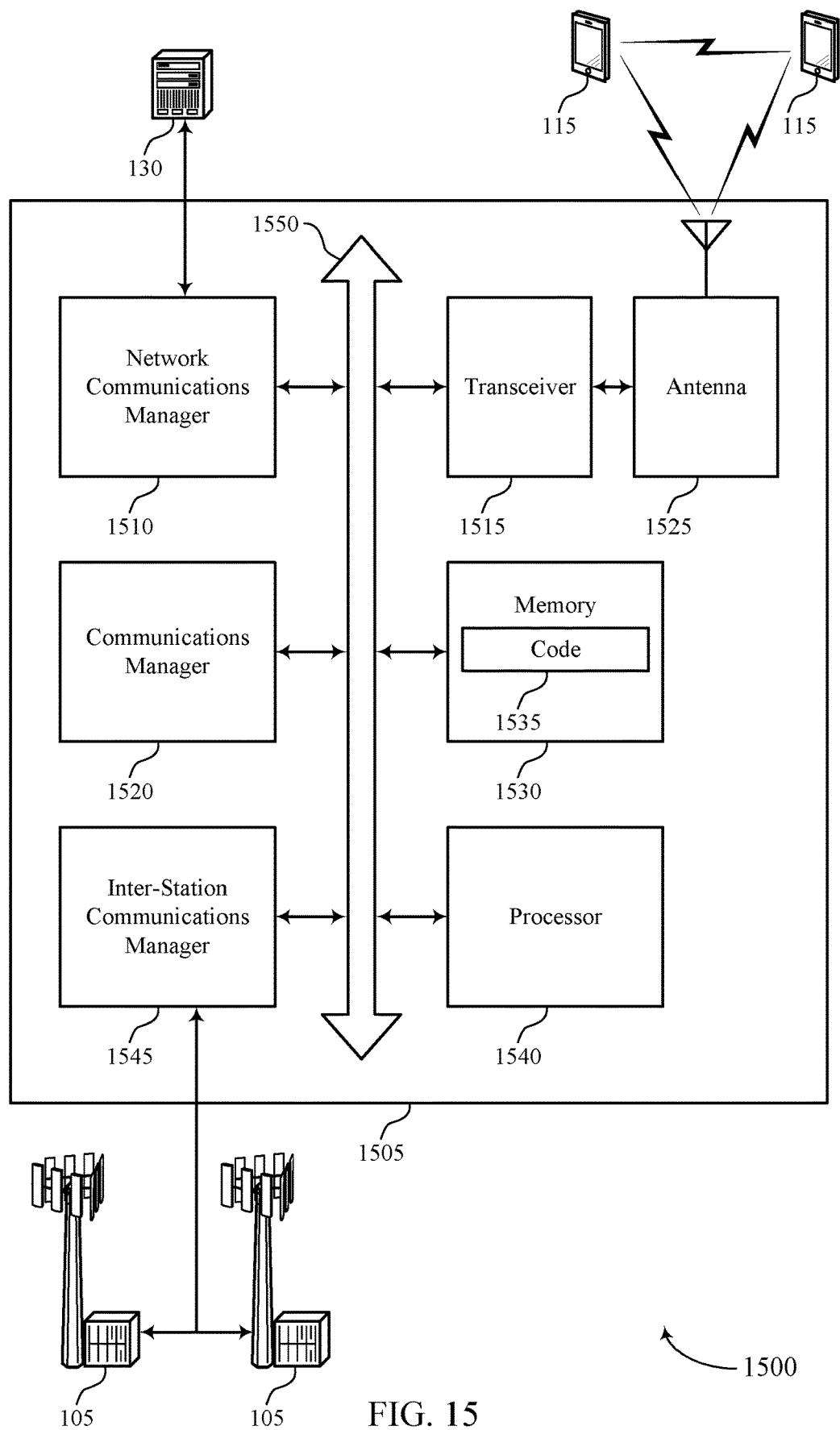
FIG. 15 shows a diagram of a system including a device that supports data collection enhancements for MBS in accordance with aspects of the present disclosure.

FIG. 15 shows a diagram of a system 1500 including a device 1505 that supports data collection enhancements for MBS in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting data collection enhancements for MBS). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for identifying, for a UE, a measurement configuration for MDT measurement and reporting supporting broadcast receptions at the UE within an SFN. The communications manager 1520 may be configured as or otherwise support a means for transmitting control signaling to the UE indicating the measurement configuration. The communications manager 1520 may be configured as or otherwise support a means for receiving, from the UE, an MDT report indicating a set of measurements for the SFN determined by the UE.

Additionally, or alternatively, the communications manager 1520 may support wireless communication at a first base station in accordance with examples as disclosed herein. For example, the communications manager 1520 may be configured as or otherwise support a means for attempting to perform a handover procedure of a UE from a second base station to the first base station. The communications manager 1520 may be configured as or otherwise support a means for determining that the UE is performing the handover procedure based on the UE participating in MBS-based communications. The communications manager 1520 may be configured as or otherwise support a means for transmitting a handover report to the second base station indicating that the handover procedure of the UE was attempted, where the handover report indicates information associated with the UE performing the handover based on the UE participating in the MBS-based communications.

Additionally, or alternatively, the communications manager 1520 may support wireless communication at a first base station in accordance with examples as disclosed herein. For example, the communications manager 1520 may be configured as or otherwise support a means for identifying a first network load metric associated with the first base station performing unicast-based communications. The communications manager 1520 may be configured as or otherwise support a means for identifying a second network load metric associated with the first base station performing MBS-based communications. The communications manager 1520 may be configured as or otherwise support a means for transmitting an indication of the first network load metric and the second network load metric to a second base station.

By including or configuring the communications manager 1520 in accordance with examples as described herein, the device 1505 may support techniques for MBS enhancements within an SFN utilizing various MDT techniques, handover procedures based on MBS communications, and/or network load balancing that includes MBS-related load levels.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of data collection enhancements for MBS as described herein, or the processor 1540 and the memory 1530 may be otherwise configured to perform or support such operations.

Figure 16:
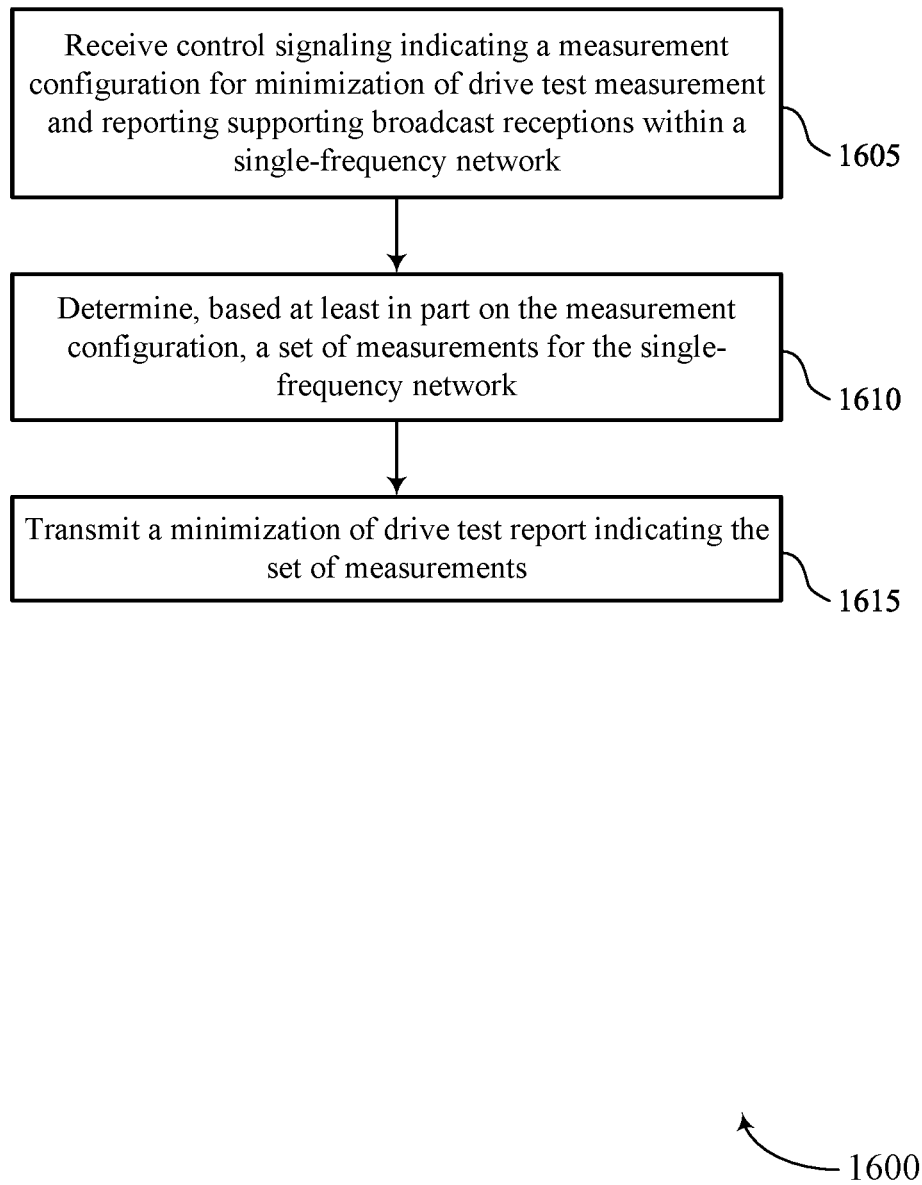
FIGS. 16 through 20 show flowcharts illustrating methods that support data collection enhancements for MBS in accordance with aspects of the present disclosure.

FIG. 16 shows a flowchart illustrating a method 1600 that supports data collection enhancements for MBS in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a measurement configuration for MDT measurement and reporting supporting broadcast receptions within an SFN. The operations of 1605 may be performed in accordance with examples as disclosed herein. In some examples, aspects of the operations of 1605 may be performed by an MDT configuration manager 1025 as described with reference to FIG. 10.

At 1610, the method may include determining, based on the measurement configuration, a set of measurements for the SFN. The operations of 1610 may be performed in accordance with examples as disclosed herein. In some examples, aspects of the operations of 1610 may be performed by an MDT measurement manager 1030 as described with reference to FIG. 10.

At 1615, the method may include transmitting an MDT report indicating the set of measurements. The operations of 1615 may be performed in accordance with examples as disclosed herein. In some examples, aspects of the operations of 1615 may be performed by an MDT report manager 1035 as described with reference to FIG. 10.

Figure 17:
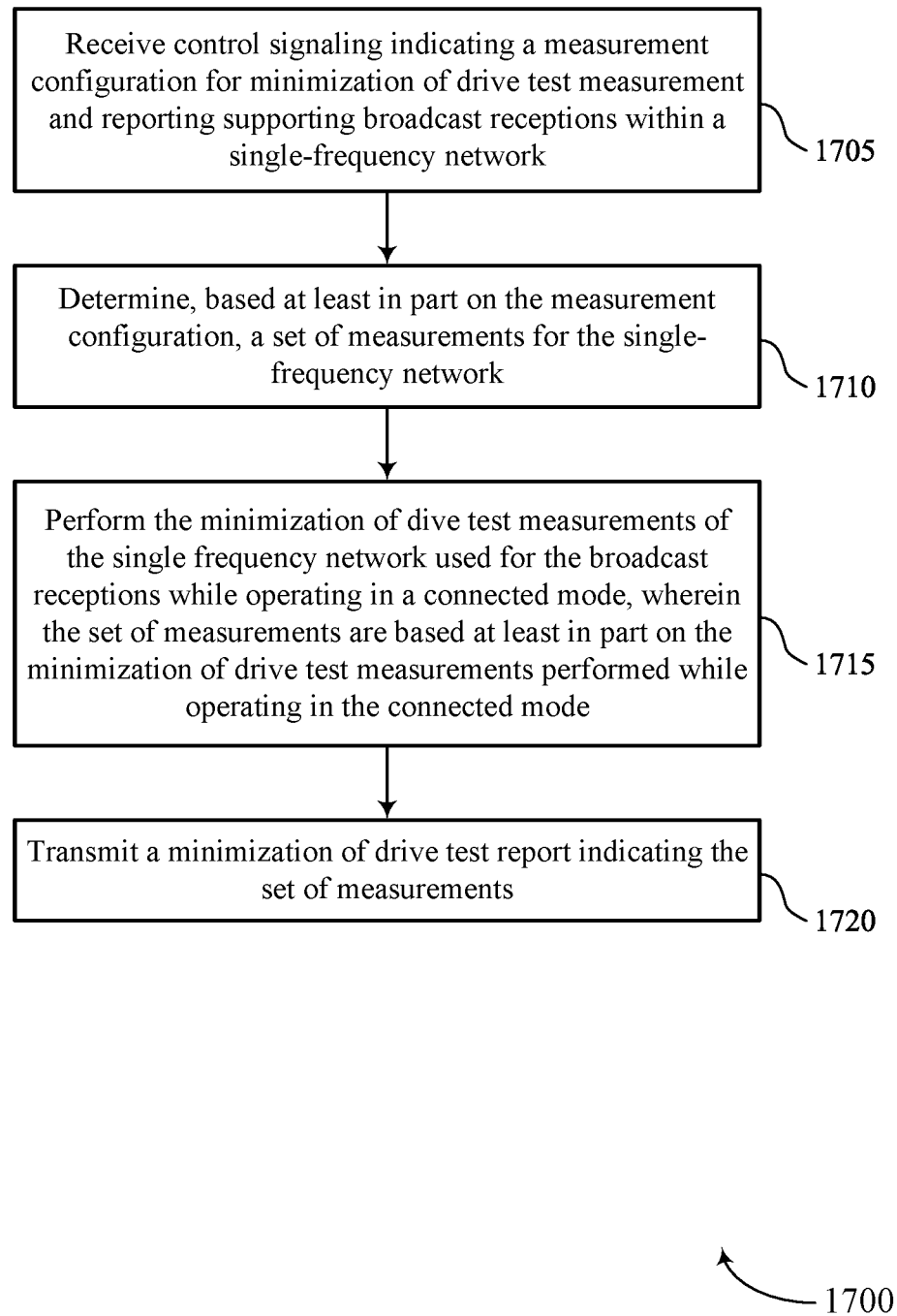

FIG. 17 shows a flowchart illustrating a method 1700 that supports data collection enhancements for MBS in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating a measurement configuration for MDT measurement and reporting supporting broadcast receptions within an SFN. The operations of 1705 may be performed in accordance with examples as disclosed herein. In some examples, aspects of the operations of 1705 may be performed by an MDT configuration manager 1025 as described with reference to FIG. 10.

At 1710, the method may include determining, based on the measurement configuration, a set of measurements for the SFN. The operations of 1710 may be performed in accordance with examples as disclosed herein. In some examples, aspects of the operations of 1710 may be performed by an MDT measurement manager 1030 as described with reference to FIG. 10.

At 1715, the method may include performing the minimization of dive test measurements of the SFN used for the broadcast receptions while operating in a connected mode, where the set of measurements are based on the MDT measurements performed while operating in the connected mode. The operations of 1715 may be performed in accordance with examples as disclosed herein. In some examples, aspects of the operations of 1715 may be performed by a connection state manager 1040 as described with reference to FIG. 10.

At 1720, the method may include transmitting an MDT report indicating the set of measurements. The operations of 1720 may be performed in accordance with examples as disclosed herein. In some examples, aspects of the operations of 1720 may be performed by an MDT report manager 1035 as described with reference to FIG. 10.

Figure 18:
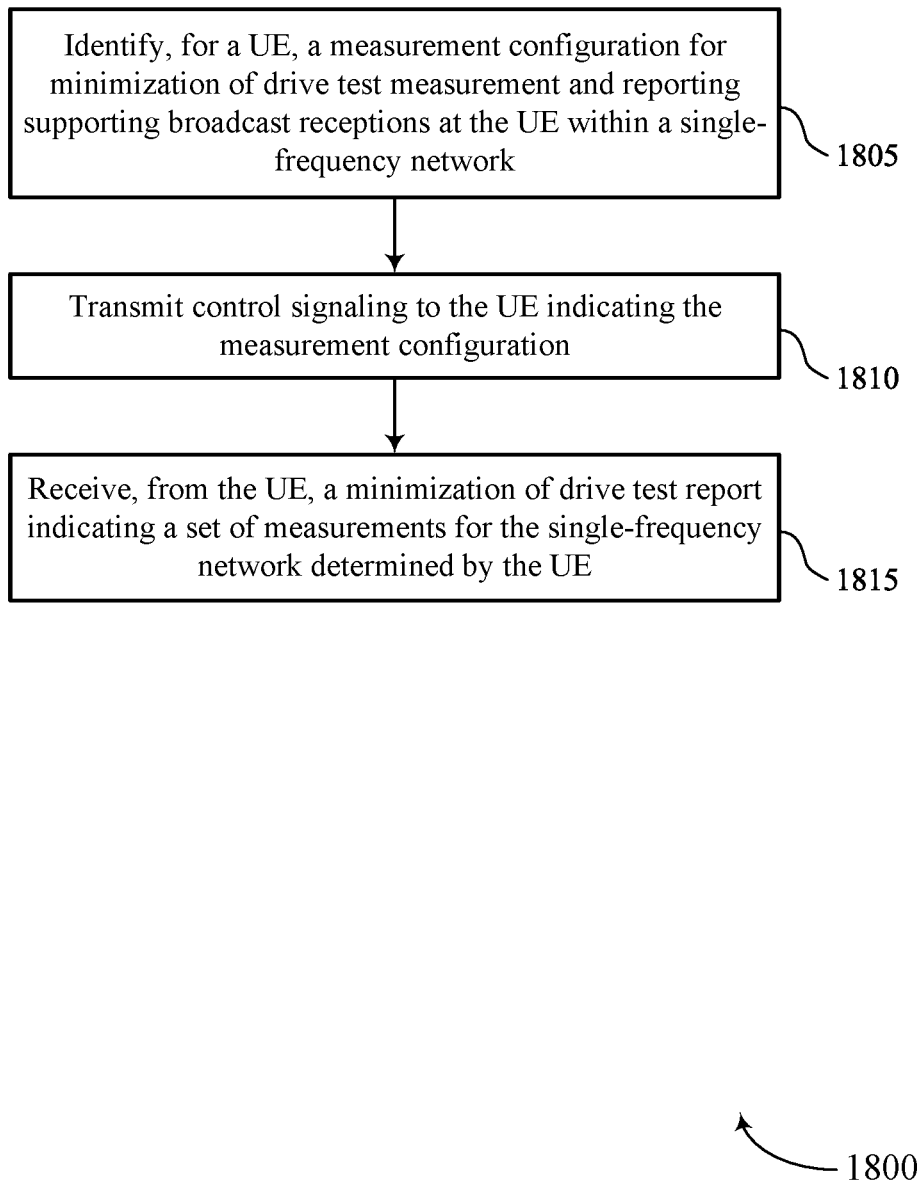

FIG. 18 shows a flowchart illustrating a method 1800 that supports data collection enhancements for MBS in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1805, the method may include identifying, for a UE, a measurement configuration for MDT measurement and reporting supporting broadcast receptions at the UE within an SFN. The operations of 1805 may be performed in accordance with examples as disclosed herein. In some examples, aspects of the operations of 1805 may be performed by an MDT manager 1425 as described with reference to FIG. 14.

At 1810, the method may include transmitting control signaling to the UE indicating the measurement configuration. The operations of 1810 may be performed in accordance with examples as disclosed herein. In some examples, aspects of the operations of 1810 may be performed by an MDT manager 1425 as described with reference to FIG. 14.

At 1815, the method may include receiving, from the UE, an MDT report indicating a set of measurements for the SFN determined by the UE. The operations of 1815 may be performed in accordance with examples as disclosed herein. In some examples, aspects of the operations of 1815 may be performed by an MDT manager 1425 as described with reference to FIG. 14.

Figure 19:
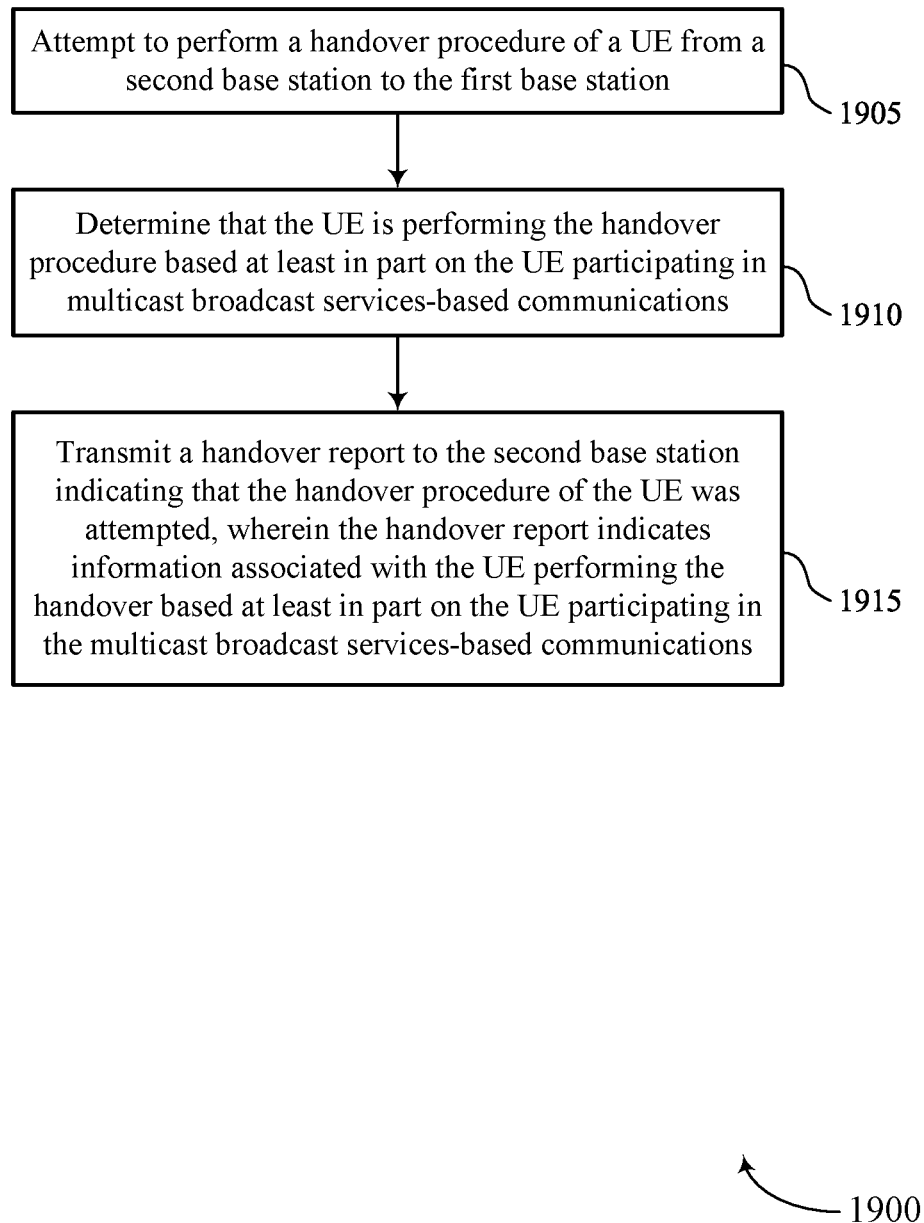

FIG. 19 shows a flowchart illustrating a method 1900 that supports data collection enhancements for MBS in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include attempting to perform a handover procedure of a UE from a second base station to the first base station. The operations of 1905 may be performed in accordance with examples as disclosed herein. In some examples, aspects of the operations of 1905 may be performed by a handover manager 1430 as described with reference to FIG. 14.

At 1910, the method may include determining that the UE is performing the handover procedure based on the UE participating in MBS-based communications. The operations of 1910 may be performed in accordance with examples as disclosed herein. In some examples, aspects of the operations of 1910 may be performed by a handover manager 1430 as described with reference to FIG. 14.

At 1915, the method may include transmitting a handover report to the second base station indicating that the handover procedure of the UE was attempted, where the handover report indicates information associated with the UE performing the handover based on the UE participating in the MBS-based communications. The operations of 1915 may be performed in accordance with examples as disclosed herein. In some examples, aspects of the operations of 1915 may be performed by a handover manager 1430 as described with reference to FIG. 14.

Figure 20:
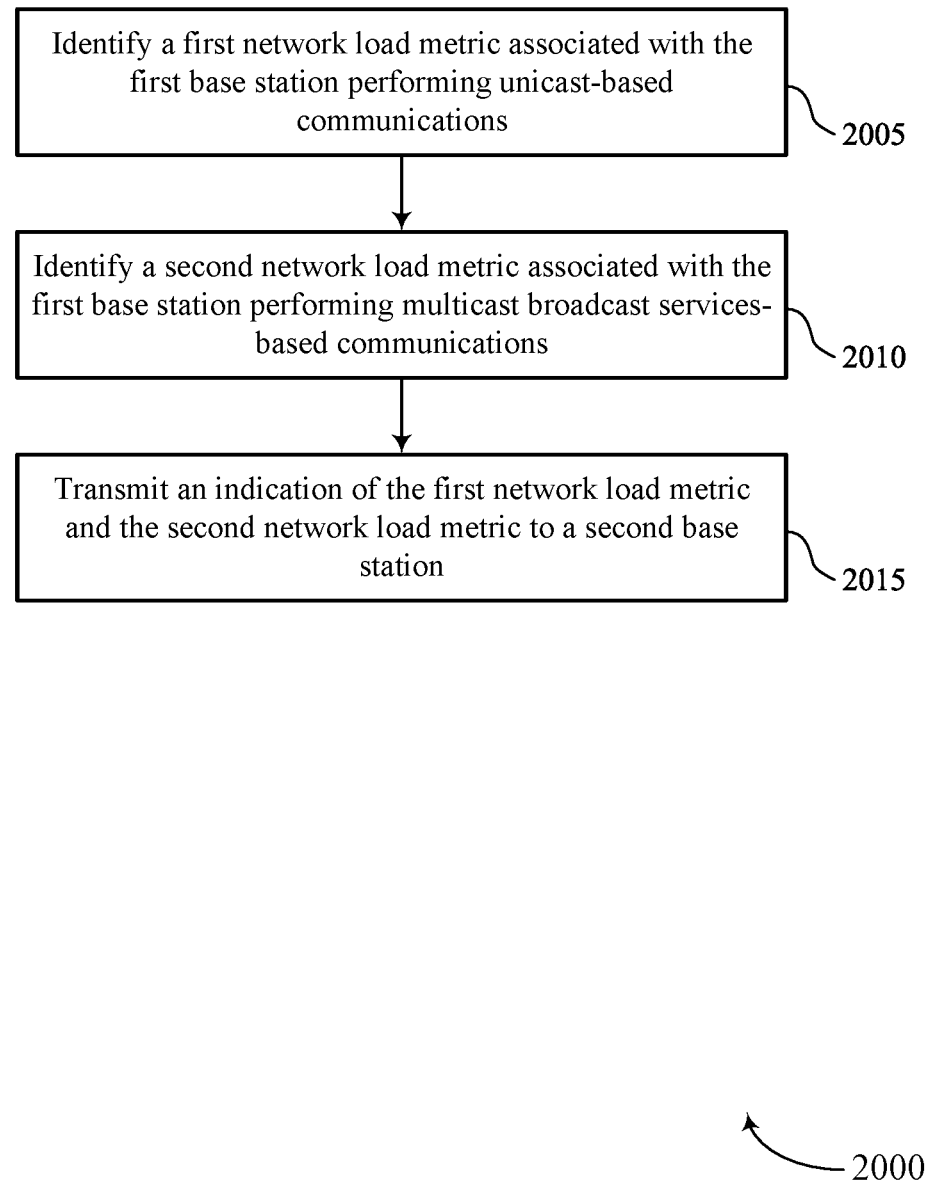

FIG. 20 shows a flowchart illustrating a method 2000 that supports data collection enhancements for MBS in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2005, the method may include identifying a first network load metric associated with the first base station performing unicast-based communications. The operations of 2005 may be performed in accordance with examples as disclosed herein. In some examples, aspects of the operations of 2005 may be performed by a load balancing manager 1435 as described with reference to FIG. 14.

At 2010, the method may include identifying a second network load metric associated with the first base station performing MBS-based communications. The operations of 2010 may be performed in accordance with examples as disclosed herein. In some examples, aspects of the operations of 2010 may be performed by a load balancing manager 1435 as described with reference to FIG. 14.

At 2015, the method may include transmitting an indication of the first network load metric and the second network load metric to a second base station. The operations of 2015 may be performed in accordance with examples as disclosed herein. In some examples, aspects of the operations of 2015 may be performed by a load balancing manager 1435 as described with reference to FIG. 14.

The following provides an overview of aspects of the present disclosure:

Aspect 1: A method for wireless communication at a UE, comprising: receiving control signaling indicating a measurement configuration for MDT measurement and reporting supporting broadcast receptions within a SFN; determining, based at least in part on the measurement configuration, a set of measurements for the SFN; and transmitting a MDT report indicating the set of measurements.

Aspect 2: The method of aspect 1, further comprising: performing the minimization of dive test measurements of the SFN used for the broadcast receptions while operating in a connected mode, wherein the set of measurements are based at least in part on the MDT measurements performed while operating in the connected mode.

Aspect 3: The method of aspect 2, further comprising: transmitting the MDT report while operating in the connected mode.

Aspect 4: The method of claim 3, wherein the MDT report indicates an interruption time associated with a handover procedure, a data volume level, a multicast transmission/retransmission success ratio, a unicast transmission/retransmission success ratio, a switching rate, or a combination thereof.

Aspect 5: The method of any of aspects 1 through 4, further comprising: performing the minimization of dive test measurements of the SFN while operating in an inactive mode or an idle mode, wherein the set of measurements are based at least in part on the MDT measurements.

Aspect 6: The method of any of aspects 1 through 5, further comprising: transmitting, based at least in part on the broadcast receptions within the SFN, an indication that the MDT report is available.

Aspect 7: The method of any of aspects 1 through 6, further comprising: logging the MDT measurements performed while operating in an inactive mode or an idle mode to obtain logged MDT measurements that support broadcast receptions within the SFN.

Aspect 8: The method of any of aspects 1 through 7, wherein the MDT report indicates the set of measurements on a per-beam basis for the broadcast receptions within the SFN.

Aspect 9: The method of any of aspects 1 through 8, further comprising: identifying a trigger event associated with the broadcast receptions within the SFN that has satisfied a threshold, wherein determining the set of measurements is triggered based at least in part on the trigger event satisfying the threshold.

Aspect 10: The method of aspect 9, wherein the trigger event is based on at least one of a RSRP level, a RSRQ level, a SINK level, a data volume, a BLER, or a combination, for the broadcast receptions within the SFN.

Aspect 11: The method of any of aspects 1 through 10, further comprising: receiving a second control signaling indicating a second measurement configuration for MDT measurement and reporting supporting unicast receptions; determining, based at least in part on the second control signaling, a second set of measurements associated with the unicast receptions, wherein the MDT report indicates the set of measurements associated with the broadcast receptions within the SFN and the second set of measurements associated with the unicast receptions.

Aspect 12: The method of any of aspects 1 through 11, further comprising: determining, while operating in an inactive mode or an idle mode, that a link associated with the broadcast receptions has failed; performing a handover procedure of the UE to a first base station from a second base station based at least in part on the failed link; and transmitting a logged MDT report or a mobility history report based at least in part on the failed link.

Aspect 13: The method of aspect 12, wherein the logged MDT report or the mobility history report comprises an indication that the broadcast receptions failed at the UE, an indication of an identifier of the cell associated with the failed link, a failure duration associated with the failed link, or any combination thereof.

Aspect 14: A method for wireless communication at a base station, comprising: identifying, for a UE, a measurement configuration for MDT measurement and reporting supporting broadcast receptions at the UE within a SFN; transmitting control signaling to the UE indicating the measurement configuration; and receiving, from the UE, a MDT report indicating a set of measurements for the SFN determined by the UE.

Aspect 15: The method of aspect 14, further comprising: receiving the MDT report while the UE is operating an a connected mode.

Aspect 16: The method of claim 15, wherein the MDT report indicates an interruption time associated with a handover procedure, a data volume level, a multicast transmission/retransmission success ratio, a unicast transmission/retransmission success ratio, a switching rate, or a combination thereof.

Aspect 17: The method of any of aspects 14 through 16, further comprising: receiving, based at least in part on the broadcast receptions within the SFN, an indication that the MDT report is available.

Aspect 18: The method of any of aspects 14 through 17, wherein the MDT report indicates the set of measurements on a per-beam basis for the broadcast receptions within the SFN.

Aspect 19: The method of any of aspects 14 through 18, further comprising: receiving a second control signaling indicating a second measurement configuration for MDT measurement and reporting supporting unicast receptions, wherein the MDT report indicates the set of measurements associated with the broadcast receptions within the SFN and a second set of measurements associated with the unicast receptions.

Aspect 20: A method for wireless communication at a first base station, comprising: attempting to perform a handover procedure of a UE from a second base station to the first base station; determining that the UE is performing the handover procedure based at least in part on the UE participating in MBS-based communications; and transmitting a handover report to the second base station indicating that the handover procedure of the UE was attempted, wherein the handover report indicates information associated with the UE performing the handover based at least in part on the UE participating in the MBS-based communications.

Aspect 21: The method of aspect 20, further comprising: determining that the handover procedure of the UE was unsuccessful, wherein the handover report indicates one or more parameters associated with the handover procedure being unsuccessful.

Aspect 22: The method of aspect 21, wherein the one or more parameters comprise a handover failure cause associated with the UE participating in the MBS-based communications, an indication that the handover procedure was a MBS-based handover procedure, an indication that the handover procedure involved a MBS radio bearer, a MBS-based session identifier, a MBS-based service identifier, a MBS-based radio bearer identifier, a MBS-based measurement report, an indication that the handover procedure was based at least in part on a failure associated with the MBS, or any combination thereof.

Aspect 23: The method of any of aspects 20 through 22, further comprising: determining that the handover procedure of the UE was successful, wherein the handover report indicates one or more radio link monitoring parameters of a control channel associated with the MBS-based communications.

Aspect 24: A method for wireless communication at a first base station, comprising: identifying a first network load metric associated with the first base station performing unicast-based communications; identifying a second network load metric associated with the first base station performing MB S-based communications; and transmitting an indication of the first network load metric and the second network load metric to a second base station.

Aspect 25: The method of aspect 24, further comprising: scheduling for the unicast-based communications, the MBS-based communications, or both, based at least in part on the first network load metric, the second network load metric, or both.

Aspect 26: The method of any of aspects 24 through 25, further comprising: receiving, from the second base station, an indication of a third network load metric associated with the second base station performing unicast-based communications and a fourth network load metric associated with the second base station performing MB S-based communications; and scheduling for the unicast-based communications, the MB S-based communications, or both, based at least in part on the first network load metric, the second network load metric, the third network load metric, the fourth network load metric, or a combination thereof.

Aspect 27: The method of any of aspects 24 through 26, wherein the indication comprises a load per-cell level for the unicast-based communications and the multicast services-based communications, a load per-beam level for the unicast-based communications and the multicast services-based communications, a load per-slice level for the unicast-based communications and the multicast services-based communications, a load per-SFN level for the unicast-based communications and the multicast services-based communications, or any combination thereof.

Aspect 28: An apparatus for wireless communication at a UE, comprising a processor; memory coupled with the processor; and instructions stored in the memory and executable by the processor to cause the apparatus to perform a method of any of aspects 1 through 13.

Aspect 29: An apparatus for wireless communication at a UE, comprising at least one means for performing a method of any of aspects 1 through 13.

Aspect 30: A non-transitory computer-readable medium storing code for wireless communication at a UE, the code comprising instructions executable by a processor to perform a method of any of aspects 1 through 13.

Aspect 31: An apparatus for wireless communication at a base station, comprising a processor; memory coupled with the processor; and instructions stored in the memory and executable by the processor to cause the apparatus to perform a method of any of aspects 14 through 19.

Aspect 32: An apparatus for wireless communication at a base station, comprising at least one means for performing a method of any of aspects 14 through 19.

Aspect 33: A non-transitory computer-readable medium storing code for wireless communication at a base station, the code comprising instructions executable by a processor to perform a method of any of aspects 14 through 19.

Aspect 34: An apparatus for wireless communication at a first base station, comprising a processor; memory coupled with the processor; and instructions stored in the memory and executable by the processor to cause the apparatus to perform a method of any of aspects 20 through 23.

Aspect 35: An apparatus for wireless communication at a first base station, comprising at least one means for performing a method of any of aspects 20 through 23.

Aspect 36: A non-transitory computer-readable medium storing code for wireless communication at a first base station, the code comprising instructions executable by a processor to perform a method of any of aspects 20 through 23.

Aspect 37: An apparatus for wireless communication at a first base station, comprising a processor; memory coupled with the processor; and instructions stored in the memory and executable by the processor to cause the apparatus to perform a method of any of aspects 24 through 27.

Aspect 38: An apparatus for wireless communication at a first base station, comprising at least one means for performing a method of any of aspects 24 through 27.

Aspect 39: A non-transitory computer-readable medium storing code for wireless communication at a first base station, the code comprising instructions executable by a processor to perform a method of any of aspects 24 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a measurement configuration for minimization of drive test measurement and reporting supporting broadcast receptions within a single-frequency network;
   performing, while operating in a connected mode and based at least in part on the measurement configuration, minimization of drive test measurements of the single-frequency network for the broadcast receptions to determine a set of measurements for the single-frequency network; and transmitting, while operating in the connected mode, a minimization of drive test report indicating the set of measurements, wherein the minimization of drive test report indicates a multicast transmission/retransmission success ratio, a unicast transmission/retransmission success ratio, or a combination thereof.

2. The method of claim 1, further comprising:

performing minimization of drive test measurements of the single-frequency network while operating in an inactive mode or an idle mode, wherein the set of measurements are based at least in part on the minimization of drive test measurements.

3. The method of claim 1, further comprising:

transmitting, based at least in part on the broadcast receptions within the single-frequency network, an indication that the minimization of drive test report is available.

4. The method of claim 1, further comprising:

logging minimization of drive test measurements performed while operating in an inactive mode or an idle mode to obtain logged minimization of drive test measurements that support broadcast receptions within the single-frequency network.

5. The method of claim 1, wherein the minimization of drive test report indicates the set of measurements on a per-beam basis for the broadcast receptions within the single-frequency network.

6. The method of claim 1, further comprising:

identifying a trigger event associated with the broadcast receptions within the single-frequency network that has satisfied a threshold, wherein determining the set of measurements is triggered based at least in part on the trigger event satisfying the threshold.

7. The method of claim 6, wherein the trigger event is based on at least one of a reference signal received power level, a reference signal received quality level, a signal-to-interference-to-noise level, a data volume, a block level error rate, or a combination, for the broadcast receptions within the single-frequency network.

8. The method of claim 1, further comprising:

receiving a second control signaling indicating a second measurement configuration for minimization of drive test measurement and reporting supporting unicast receptions; and determining, based at least in part on the second control signaling, a second set of measurements associated with the unicast receptions, wherein the minimization of drive test report indicates the set of measurements associated with the broadcast receptions within the single-frequency network and the second set of measurements associated with the unicast receptions.

9. The method of claim 1, further comprising:

determining, while operating in an inactive mode or an idle mode, that a link associated with the broadcast receptions has failed;

performing a handover procedure of the UE to a first network device from a second network device based at least in part on the failed link; and transmitting a logged minimization of drive test report or a mobility history report based at least in part on the failed link.

10. The method of claim 9, wherein the logged minimization of drive test report or the mobility history report comprises an indication that the broadcast receptions failed at the UE, an indication of an identifier of a cell associated with the failed link, a failure duration associated with the failed link, or any combination thereof.

11. An apparatus for wireless communication at a user equipment (UE), comprising:

a processor;

memory coupled with the processor; and instructions stored in the memory and executable by the processor to cause the apparatus to:

receive control signaling indicating a measurement configuration for minimization of drive test measurement and reporting supporting broadcast receptions within a single-frequency network;

perform, during operation of the UE in a connected mode and based at least in part on the measurement configuration, minimization of drive test measurements of the single-frequency network for the broadcast receptions to determine a set of measurements for the single-frequency network; and transmit, during operation of the UE in the connected mode, a minimization of drive test report indicating the set of measurements, wherein the minimization of drive test report indicates a multicast transmission/retransmission success ratio, a unicast transmission/retransmission success ratio, or a combination thereof.

12. The apparatus of claim 11, wherein the instructions are further executable by the processor to cause the apparatus to:

perform minimization of drive test measurements of the single-frequency network while operating in an inactive mode or an idle mode, wherein the set of measurements are based at least in part on the minimization of drive test measurements.

13. The apparatus of claim 11, wherein the instructions are further executable by the processor to cause the apparatus to:

transmit, based at least in part on the broadcast receptions within the single-frequency network, an indication that the minimization of drive test report is available.

14. The apparatus of claim 11, wherein the instructions are further executable by the processor to cause the apparatus to:

log minimization of drive test measurements performed while operating in an inactive mode or an idle mode to obtain logged minimization of drive test measurements that support broadcast receptions within the single-frequency network.

15. The apparatus of claim 11, wherein the minimization of drive test report indicates the set of measurements on a per-beam basis for the broadcast receptions within the single-frequency network.

16. The apparatus of claim 11, wherein the instructions are further executable by the processor to cause the apparatus to:

identify a trigger event associated with the broadcast receptions within the single-frequency network that has satisfied a threshold, wherein determining the set of measurements is triggered based at least in part on the trigger event satisfying the threshold.

17. The apparatus of claim 16, wherein the trigger event is based on at least one of a reference signal received power level, a reference signal received quality level, a signal-to-interference-to-noise level, a data volume, a block level error rate, or a combination, for the broadcast receptions within the single-frequency network.

18. The apparatus of claim 11, wherein the instructions are further executable by the processor to cause the apparatus to:

receive a second control signaling indicating a second measurement configuration for minimization of drive test measurement and reporting supporting unicast receptions; and determine, based at least in part on the second control signaling, a second set of measurements associated with the unicast receptions, wherein the minimization of drive test report indicates the set of measurements associated with the broadcast receptions within the single-frequency network and the second set of measurements associated with the unicast receptions.

19. The apparatus of claim 11, wherein the instructions are further executable by the processor to cause the apparatus to:

determine, while operating in an inactive mode or an idle mode, that a link associated with the broadcast receptions has failed;

perform a handover procedure of the UE to a first network device from a second network device at least in part on the failed link; and transmit a logged minimization of drive test report or a mobility history report based at least in part on the failed link.

20. The apparatus of claim 19, wherein the logged minimization of drive test report or the mobility history report comprises an indication that the broadcast receptions failed at the UE, an indication of an identifier of a cell associated with the failed link, a failure duration associated with the failed link, or any combination thereof.

21. An apparatus for wireless communication at a user equipment (UE), comprising:

means for receiving control signaling indicating a measurement configuration for minimization of drive test measurement and reporting supporting broadcast receptions within a single-frequency network;

means for performing, while operating in a connected mode and based at least in part on the measurement configuration, minimization of drive test measurements of the single-frequency network for the broadcast receptions to determine a set of measurements for the single-frequency network; and means for transmitting, while operating in the connected mode, a minimization of drive test report indicating the set of measurements, wherein the minimization of drive test report indicates a multicast transmission/retransmission success ratio, a unicast transmission/retransmission success ratio, or a combination thereof.

22. A non-transitory computer-readable medium storing code for wireless communications at a user equipment (UE), the code comprising instructions executable by a processor to:

receive control signaling indicating a measurement configuration for minimization of drive test measurement and reporting supporting broadcast receptions within a single-frequency network;

perform, while operating in a connected mode and based at least in part on the measurement configuration, minimization of drive test measurements of the single-frequency network for the broadcast receptions to determine a set of measurements for the single-frequency network; and transmit, while operating in the connected mode, a minimization of drive test report indicating the set of measurements, wherein the minimization of drive test report indicates a multicast transmission/retransmission success ratio, a unicast transmission/retransmission success ratio, or a combination thereof.

* * * * *